US 11,080,859 B2

(12) United States Patent
Li

(10) Patent No.: US 11,080,859 B2
(45) Date of Patent: Aug. 3, 2021

(54) IMAGE COMMUNICATION BASED ON HIT IMAGE BLOCK CONDITIONS

(71) Applicant: Huawei Technologies Co., Ltd., Shenzhen (CN)

(72) Inventor: Yong Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/751,957

(22) Filed: Jan. 24, 2020

(65) Prior Publication Data

US 2020/0160531 A1 May 21, 2020

Related U.S. Application Data

(63) Continuation of application No. PCT/CN2018/077337, filed on Feb. 27, 2018.

(51) Int. Cl.
*G06T 7/136* (2017.01)
*G06T 7/11* (2017.01)
(Continued)

(52) U.S. Cl.
CPC ............. *G06T 7/136* (2017.01); *G06T 7/11* (2017.01); *G06T 7/13* (2017.01); *G06T 7/174* (2017.01); *G06T 2200/16* (2013.01)

(58) Field of Classification Search
CPC ... G06F 17/40; G06F 3/005; G06K 2009/363; G06K 9/00456; G06K 9/00463;
(Continued)

(56) References Cited

U.S. PATENT DOCUMENTS

2010/0152600 A1* 6/2010 Droitcour ............. A61B 5/1114
600/534
2010/0250880 A1* 9/2010 Mimatsu ............... G06F 3/0608
711/162
(Continued)

FOREIGN PATENT DOCUMENTS

CN 103294438 A 9/2013
CN 103353939 A 10/2013
(Continued)

OTHER PUBLICATIONS

Machine Translation and Abstract of Chinese Publication No. CN103294438, Sep. 11, 2013, 16 pages.
(Continued)

*Primary Examiner* — Ming Wu
(74) *Attorney, Agent, or Firm* — Conley Rose, P.C.

(57) ABSTRACT

An image sending method includes dividing a desktop image according to an image segmentation solution included in an image segmentation solution set, to obtain a target image block set, where the target image block set includes a plurality of image blocks. The target image block set meets a target condition, and the target condition includes: a percentage of hit image blocks in the target image block set is greater than or equal to a target threshold, or a percentage of hit image blocks in the target image block set is greater than a percentage of hit image blocks in another image block set. The image sending method further includes sending data information of each image block and location information of each image block in the target image block set to a user end.

20 Claims, 10 Drawing Sheets

(51) Int. Cl.
*G06T 7/13* (2017.01)
*G06T 7/174* (2017.01)

(58) Field of Classification Search
CPC .... G06K 9/3233; G06K 9/38; H04N 1/00116; H04N 1/00251; H04N 1/00403; H04N 1/387; H04N 1/3872; H04N 1/3878; H04N 1/40; H04N 2201/0081; H04N 2201/0096
See application file for complete search history.

(56) References Cited

U.S. PATENT DOCUMENTS

| | | | |
|---|---|---|---|
| 2013/0182002 A1* | 7/2013 | Macciola | H04N 1/387 345/589 |
| 2013/0301707 A1* | 11/2013 | Lai | H04N 19/147 375/240.03 |
| 2014/0321553 A1 | 10/2014 | Clark | |
| 2015/0077326 A1* | 3/2015 | Kramer | G06F 3/0325 345/156 |
| 2015/0106958 A1* | 4/2015 | Holman | G06F 21/608 726/32 |
| 2017/0195699 A1 | 7/2017 | Xu | |

FOREIGN PATENT DOCUMENTS

| | | |
|---|---|---|
| CN | 103402089 A | 11/2013 |
| CN | 103873886 A | 6/2014 |
| CN | 104469395 A | 3/2015 |
| CN | 107145340 A | 9/2017 |
| CN | 107577979 A | 1/2018 |
| EP | 3197167 A1 | 7/2017 |

OTHER PUBLICATIONS

Machine Translation and Abstract of Chinese Publication No. CN103353939, Oct. 16, 2013, 10 pages.
Machine Translation and Abstract of Chinese Publication No. CN103402089, Nov. 20, 2013, 11 pages.
Machine Translation and Abstract of Chinese Publication No. CN103873886, Jun. 18, 2014, 34 pages.
Machine Translation and Abstract of Chinese Publication No. CN107145340, Sep. 8, 2017, 23 pages.
Machine Translation and Abstract of Chinese Publication No. CN107577979, Jan. 12, 2018, 19 pages.
Foreign Communication From A Counterpart Application, Chinese Application No. 201880001490.3, Chinese Office Action dated Nov. 25, 2019, 6 pages.
Foreign Communication From A Counterpart Application, PCT Application No. PCT/CN2018/077337, English Translation of International Search Report dated Nov. 14, 2018, 2 pages.

* cited by examiner

A virtual desktop infrastructure is abbreviated to VDI in English, may implement remote access to a desktop,

FIG. 1A

A virtual desktop infrastructure is abbreviated to VDI in English, may implement remote access to a desktop,

FIG. 1B

A virtual desktop infrastructure is abbreviated to VDI in English, may implement remote access to a desktop, and is widely applied

FIG. 1C

A virtual desktop infrastructure is
abbreviated to VDI in English, may
implement remote access to a
desktop, and is widely applied

FIG. 1D

VDI, may implement remote access to a
desktop, and is widely applied. A typical
architecture of the virtual desktop
infrastructure includes

FIG. 1E

VDI, may implement remote access
to a desktop, and is widely applied.
A typical architecture of the virtual
desktop infrastructure includes

FIG. 1F

IMAGE COMMUNICATION BASED ON HIT IMAGE BLOCK CONDITIONS

CROSS-REFERENCE TO RELATED APPLICATIONS

This is a continuation of Int'l Patent App. No. PCT/CN2018/077337 filed on Feb. 27, 2018, which is incorporated by reference.

TECHNICAL FIELD

This application relates to the field of virtual desktops, and in particular, to an image sending method and apparatus and a storage medium.

BACKGROUND

A virtual desktop infrastructure (VDI) may implement remote access to a desktop. A typical architecture of the VDI may include a serving end and a user end. A virtual machine may be deployed on the serving end. The user end may access the virtual machine deployed on the serving end, and send an operation instruction to the virtual machine to use an application program in the virtual machine. The application program in the virtual machine may generate a desktop image based on the operation instruction sent by the user end, and send the desktop image to the user end by using a display protocol program in the virtual machine, to implement remote access to the desktop.

To save communication resources, when sending the desktop image to the user end, the virtual machine usually needs to use an image caching technology. In the image caching technology, the virtual machine may segment a to-be-sent desktop image to obtain a plurality of image blocks. Then, for each image block, the virtual machine may perform calculation based on pixel values of all pixels in the image block and a preset algorithm (for example, a hash algorithm) to obtain a flag value corresponding to the image block. The virtual machine may query whether the flag value corresponding to each image block is stored in a cache of the serving end. When a flag value corresponding to an image block is stored in the cache of the serving end, it indicates that the virtual machine has sent the image block to the user end, and the user end stores pixel values of the image block. In this case, the virtual machine may send the flag value corresponding to the image block to the user end, so that the user end obtains the pixel values of the image block based on the flag value. When a flag value corresponding to an image block is not stored in the cache of the serving end, the virtual machine needs to send pixel values of the image block to the user end. During actual implementation, the virtual machine may encode the pixel values of the image block, and send the encoded pixel values to the user end. It can be learned that a higher percentage of hit image blocks in the plurality of image blocks obtained by segmenting the to-be-sent desktop image indicates fewer communication resources required by the virtual machine for sending the desktop image to the user end. A hit image block is an image block whose corresponding flag value is stored in the cache of the serving end.

In a related technology, the virtual machine may segment the to-be-sent desktop image according to a fixed segmentation solution. For example, the virtual machine may segment the to-be-sent desktop image into a plurality of 64×64 image blocks by using a vertex in an upper left corner as a segmentation starting point.

When segmentation is performed in a fixed manner, a percentage of hit image blocks in the plurality of image blocks obtained by segmenting the to-be-sent desktop image is prone to be relatively small. For example, when the to-be-sent desktop image translates compared with a sent desktop image, the plurality of image blocks obtained by segmenting the to-be-sent desktop image according to the fixed segmentation solution are all likely to be different from a plurality of image blocks of the sent desktop image. In this case, a percentage of hit image blocks in the plurality of image blocks obtained by segmenting the to-be-sent desktop image is relatively small. Therefore, a waste of communication resources is caused.

SUMMARY

This application provides an image sending method and apparatus and a storage medium, to avoid a waste of communication resources between a serving end and a user end. Technical solutions provided in embodiments of this application are as follows:

According to a first aspect, an image sending method is provided, where the method includes: dividing a desktop image according to an image segmentation solution included in an image segmentation solution set, to obtain a target image block set, where the target image block set includes a plurality of image blocks, and each of the plurality of image blocks is a hit image block or a missed image block; in addition, the target image block set meets a target condition, and the target condition includes: a percentage of hit image blocks in the target image block set is greater than or equal to a target threshold, or a percentage of hit image blocks in the target image block set is greater than a percentage of hit image blocks in another image block set; and the another image block set is obtained by dividing the desktop image according to another image segmentation solution included in the image segmentation solution set; and sending data information of each image block and location information of each image block in the target image block set to a user end, where data information of the hit image block includes a flag value of the hit image block, data information of the missed image block includes image data of the missed image block, and a location of each image block in the desktop image is recorded in the location information of the image block.

A serving end divides the desktop image according to the image segmentation solution included in the image segmentation solution set, to obtain the target image block set meeting the target condition. Then the serving end sends the data information of each image block and the location information of each image block in the target image block set to the user end. The target condition includes: the percentage of the hit image blocks in the target image block set is greater than or equal to the target threshold, or the percentage of the hit image blocks in the target image block set is greater than the percentage of the hit image blocks in the another image block set. Therefore, it can be ensured that the percentage of the hit image blocks in the target image block set obtained by dividing the desktop image by the serving end is relatively high. The data information of the hit image block is the flag value of the hit image block, the data information of the missed image block is the image data of the missed image block, the image data may be pixel values of the missed image block, and a data volume of the flag value is usually less than a data volume of the image data. Therefore, compared with the missed image block, smaller bandwidth is required by the serving end for sending the data information of the hit image block to the user end. Accordingly, the relatively high percentage of the hit image blocks in the target image block set obtained by dividing the desktop image by the serving end may help reduce the bandwidth between the serving end and the user end.

Optionally, the dividing a desktop image according to an image segmentation solution included in an image segmentation solution set, to obtain a target image block set includes: separately dividing the desktop image by sequentially using a plurality of image segmentation solutions in the image segmentation solution set, until a percentage of a quantity of hit image blocks in an image block set obtained through division in a quantity of all image blocks in the image block set obtained through division is greater than or equal to the target threshold; and then using, as the target image block set, the image block set obtained through division.

Optionally, the dividing a desktop image according to an image segmentation solution included in an image segmentation solution set, to obtain a target image block set includes: separately dividing the desktop image according to each image segmentation solution in the image segmentation solution set, to obtain an image block set corresponding to each image segmentation solution; for each image block set, calculating a percentage of a quantity of hit image blocks in the image block set in a quantity of all image blocks in the image block set; and selecting, as the target image block set, an image block set with a highest percentage from a plurality of image block sets corresponding to all image segmentation solutions in the image segmentation solution set.

The serving end may determine, from at least one image block set obtained by dividing the desktop image, a target image block set in which a percentage of hit image blocks is greater than or equal to the target threshold, or determine a target image block set in which a percentage of hit image blocks is highest. Therefore, it can be ensured that the percentage of the hit image blocks in the target image block set that is finally determined by the serving end is relatively high. In this way, bandwidth between the serving end and the user end can be reduced in a subsequent step of sending the desktop image to the user end based on the target image block set.

Optionally, the plurality of image segmentation solutions in the image segmentation solution set described above include different area division manners; and in this case, the dividing the desktop image according to each image segmentation solution in the image segmentation solution set includes: dividing the desktop image into a plurality of image areas along a first direction in an area division manner of the image segmentation solution; and then dividing each of the plurality of image areas into at least one image block.

Optionally, the dividing the desktop image into a plurality of image areas along a first direction in an area division manner of an image segmentation solution in the image segmentation solution set may include: determining an instruction origin of the desktop image, where the instruction origin of the desktop image is a vertex of a bounding rectangle of the desktop image, and the first direction is parallel to a side of the bounding rectangle; and then segmenting, by using the instruction origin of the desktop image as a segmentation starting point, the desktop image into the plurality of image areas that are sequentially arranged along the first direction, where a length $k1$, in the first direction, of each of the plurality of image areas except a last image area is equal to a first preset segmentation length, and a length $k2$ of the last image area in the first direction meets $k2=N-y1 \times k1$ and $y1=\lceil N/k1 \rceil -1$, where N is a total length of the desktop image in the first direction, and $\lceil \ \rceil$ indicates rounding up.

The serving end may segment the desktop image based on a preset step (namely, the first preset segmentation length L) by using the instruction origin of the desktop image as the segmentation starting point. Therefore, when an instruction origin of a to-be-sent desktop image does not change compared with an instruction origin of a sent desktop image, there is a relatively high probability that a plurality of image areas obtained by segmenting the to-be-sent desktop image according to an instruction origin segmentation solution coincide with a plurality of image areas obtained by segmenting the sent desktop image according to the instruction origin segmentation solution, and in a subsequent step, there is accordingly a relatively high percentage of hit image blocks in an image block set obtained by segmenting the plurality of image areas of the to-be-sent desktop image. In this way, bandwidth between the serving end and the user end can be reduced.

Optionally, the dividing the desktop image into a plurality of image areas along a first direction in an area division manner of an image segmentation solution in the image segmentation solution set includes: segmenting, by using an instruction origin of the desktop image as a segmentation starting point, the desktop image into the plurality of image areas that are sequentially arranged along the first direction, where a length $k3$, in the first direction, of each of the plurality of image areas except a first image area and a last image area is equal to a first preset segmentation length L, a first boundary of the first image area passes the instruction origin of the desktop image, a coordinate value of a second boundary of the first image area in the first direction in a screen coordinate system falls within a coordinate range of the desktop image in the first direction in the screen coordinate system, and is an integer multiple of the first preset segmentation length, both the first boundary and the second boundary are perpendicular to the first direction, a distance between the first boundary and the second boundary is less than or equal to the first preset segmentation length, and a length $k4$ of the first image area in the first direction and a length $k5$ of the last image area in the first direction meet $y2 \times k3+k4+k5=N$, where $y2=\lceil (N-k4)/k3 \rceil -1$, N is a total length of the desktop image in the first direction, $\lceil \ \rceil$ indicates rounding up, and k4 is equal to the distance between the first boundary and the second boundary.

During actual application, when the desktop image relatively significantly changes (for example, the desktop image significantly changes when the user end initially establishes a connection to a virtual machine deployed on the serving end), the serving end usually sends an entire image to the user end. A size of the entire image is the same as a size of a user end screen. In other words, an instruction origin of the entire image coincides with an upper left corner of the user end screen. When sending the entire image, the serving end may segment the entire image based on a fixed step (the first preset length L) by using the instruction origin (the upper left corner of the user end screen) as a segmentation starting point, to obtain a plurality of image areas. Therefore, coordinate values, in the first direction in the screen coordinate system of the user end, of two boundaries that are parallel to a second direction and that are in each of the plurality of image areas obtained by segmenting the entire image are both an integer multiple of the first preset segmentation length L.

In this embodiment of this application, the coordinate value, in the first direction in the screen coordinate system of the user end, of the second boundary of the first image area obtained by segmenting the desktop image by the serving end is an integer multiple of the first preset segmentation length L. After obtaining the first image area through segmentation, the serving end may segment another area of the desktop image based on a fixed step to obtain other image areas different from the first image area and the last image area. Because the fixed step is the first preset segmentation length, coordinate values, in the first direction in the screen coordinate system of the user end, of two boundaries that are parallel to the second direction and that are in each of the other image areas are both an integer multiple of the first preset segmentation length L.

In this way, the other image areas that are different from the first image area and the last image area and that are obtained by segmenting the desktop image coincide with the image areas obtained by segmenting the entire desktop image. In a subsequent step, there is accordingly a relatively high percentage of hit image blocks in an image block set obtained by segmenting the other image areas. In this way, bandwidth between the serving end and the user end can be reduced.

Optionally, the dividing the desktop image into a plurality of image areas along a first direction in an area division manner of an image segmentation solution in the image segmentation solution set includes: determining a target image block in a preset area of the desktop image, where the target image block is a hit image block, a length of the target image block in the first direction is equal to a first preset segmentation length L, a length of the target image block in a second direction is equal to a second preset segmentation length L', the first direction is perpendicular to the second direction, and an instruction origin of the preset area is the same as an instruction origin of the desktop image; and then segmenting, by using the instruction origin of the desktop image as a segmentation starting point, the desktop image into the plurality of image areas that are sequentially arranged along the first direction, where a length k6, in the first direction, of each of the plurality of image areas except a first image area and a last image area is equal to the first preset segmentation length L, and a length k7 of the first image area in the first direction and a length k8 of the last image area in the first direction meet y3× k6+k7+k8=N, where y3=⌈(N−k7)/k6⌉−1, N is a total length of the desktop image in the first direction, ⌈ ⌉ indicates rounding up, and k7 is equal to a distance, in the first direction, between an instruction origin of the target image block and the instruction origin of the desktop image.

Optionally, the distance L1, in the first direction, between the instruction origin of the target image block and the instruction origin of the desktop image meets 0<L1<L, and a distance L2, in the second direction, between the instruction origin of the target image block and the instruction origin of the desktop image meets 0≤L2<L'.

When an instruction origin of a to-be-sent desktop image changes compared with an instruction origin of a sent desktop image, in this embodiment of this application, a possible location of the instruction origin of the sent desktop image in the first direction may be searched for. Then the serving end may segment the desktop image based on the fixed step (namely, the first preset segmentation length) by using the possible location as a segmentation starting point. In this way, there is a relatively high possibility that a plurality of image areas obtained by segmenting the to-be-sent desktop image coincide with a plurality of image areas obtained by segmenting the sent desktop image, and in a subsequent step, there is accordingly a relatively high percentage of hit image blocks in an image block set obtained by segmenting the plurality of image areas of the to-be-sent desktop image. In this way, bandwidth between the serving end and the user end can be reduced.

It can be learned based on the foregoing descriptions that, because the target image block is the hit image block, and a distance between the instruction origin of the target image block and the instruction origin of the to-be-sent desktop image is relatively small, the target image block is likely to be a first image block in a first image area obtained by segmenting the sent desktop image. In other words, the instruction origin of the target image block is likely to coincide with the instruction origin of the sent desktop image. Therefore, searching for the instruction origin of the target image block by the serving end is essentially searching for the possible location of the instruction origin of the sent desktop image in the first direction.

Optionally, the dividing each of the plurality of image areas into at least one image block includes: separately dividing the image area sequentially according to block segmentation solutions included in a block segmentation solution set, to obtain a target image block subset, where the target image block subset includes a plurality of image blocks; the target image block subset meets a target sub-condition; the target sub-condition includes: a percentage of hit image blocks in the target image block subset is greater than or equal to a target sub-threshold, or a percentage of hit image blocks in the target image block subset is greater than a percentage of hit image blocks in another image block subset; and the another image block subset is obtained by dividing the image area according to another block segmentation solution included in the block segmentation solution set.

Optionally, the dividing the image area according to a block segmentation solution set, selecting, from the block segmentation solution set, the block segmentation solution meeting the target sub-condition, and determining the target image block subset obtained by dividing the image area according to the target block segmentation solution includes: dividing the image area by sequentially using a plurality of block segmentation solutions in the block segmentation solution set, until a percentage of a quantity of hit image blocks in an image block subset obtained through division in a quantity of all image blocks in the image block subset obtained through division is greater than or equal to the target sub-threshold; and using, as the target image block subset, the image block subset obtained through division, and using, as the target block segmentation solution, a block segmentation solution corresponding to the image block subset obtained through division.

Optionally, the dividing the image area according to the block segmentation solution set, selecting, from the block segmentation solution set, the block segmentation solution meeting the target sub-condition, and determining the target image block subset obtained by dividing the image area according to the target block segmentation solution includes: dividing the image area by traversing a plurality of block segmentation solutions in the block segmentation solution set, to obtain a plurality of image block subsets corresponding to the plurality of block segmentation solutions; for each of the plurality of image block subsets, correspondingly determining a percentage of a quantity of hit image blocks in the image block subset in a quantity of all image blocks in the image block subset; determining a highest percentage in percentages corresponding to the plurality of image block subsets; and selecting, as the target image block subset, an image block subset with the highest percentage from the plurality of image block subsets, and determining, as the target sub-image segmentation solution, a sub-image segmentation solution corresponding to the image block subset with the highest percentage.

Optionally, the separately dividing the image area sequentially according to block segmentation solutions in a block segmentation solution set includes: determining, from a length value set, a first length value R1 corresponding to the block segmentation solution, where the length value set includes a plurality of length values, each length value included in the length value set is less than or equal to the second preset segmentation length L', and different length values in the length value set are used in different block segmentation solutions in the block segmentation solution set; and segmenting the image area into the plurality of image blocks that are sequentially arranged along the second direction, where a length p1, in the second direction, of each of the plurality of image blocks except a first image block and a last image block is equal to the second preset segmentation length L', and a length p2 of the first image block in the second direction and a length p3 of the last image block in the second direction meet z×p1+p2+p3=M, where z=⌈(M−p2)/p1⌉−1, M is a total length of the desktop image in the second direction, ⌈ ⌉ indicates rounding up, p2 is equal to the first length value R1, and the second direction is perpendicular to the first direction.

Optionally, a priority order of the plurality of length values in the length value set is determined based on historical hit ratios, and the hit ratios are percentages of hit image blocks in image block subsets obtained by dividing the image area based on the length values; and a priority order of the plurality of block segmentation solutions in the block segmentation solution set corresponds to the priority order in the length value set.

Optionally, the dividing the image area according to the block segmentation solution set includes: obtaining a second length value, where the second length value is a length value used in a target block segmentation solution used to divide a previous image area of the image area, and the previous image area is an image area that is adjacent to the image area along the first direction in the desktop image and that has been divided into image blocks; then dividing the image area by using the block segmentation solution corresponding to the second length value, to obtain an alternative image block subset; using the alternative image block subset as the target image block subset when a percentage of hit image blocks in the alternative image block subset is greater than or equal to the target sub-threshold; or when a percentage of hit image blocks in the alternative image block subset is less than the target sub-threshold, dividing the image area by sequentially using the plurality of block segmentation solutions in the block segmentation solution set, to obtain the target image block subset.

It can be learned from the foregoing descriptions that, when dividing the image area, the serving end may use at least one different length value as the length of the first image block in the second direction to perform segmentation to obtain the first image block, and then the serving end may segment another portion of the image area based on the fixed step (namely, the second preset segmentation length) to obtain the last image block and other image blocks different from the first image block and the last image block. In other words, the serving end may segment the image area based on the fixed step by using the first image block as the segmentation starting point. In this way, when a to-be-sent desktop image translates compared with a sent desktop image, the serving end may divide an image area of the to-be-sent desktop image at least once, to search for a possible translation length of the to-be-sent desktop image. The possible translation length is a length of a first image block in the second direction. When the serving end may obtain an image block subset corresponding to the possible translation length, and use the image block subset as the target image block subset, there is a relatively high possibility that other image blocks in the target image block subset except the first image block and a last image block coincide with image blocks obtained by segmenting the sent desktop image. Therefore, there is a relatively high percentage of hit image blocks in a plurality of image blocks included in the target image block subset, thereby reducing bandwidth between the serving end and the user end.

In addition, in this embodiment of this application, when a percentage of hit image blocks in an image block subset obtained by dividing the image area by the serving end based on a length value in the length value set is greater than or equal to the target sub-threshold, the serving end may stop dividing the image area. Therefore, a more forward location of the length value arranged in the length value set indicates a smaller quantity of times the serving end divides the image area and a smaller calculation amount of the serving end. Therefore, to reduce the calculation amount of the serving end, the length values in the length value set may be arranged in descending order of the hit ratios.

In a possible case, there is a relatively high possibility that length values (which are briefly referred to as target length values below) corresponding to target image segmentation solutions of adjacent image areas are the same. Therefore, to further reduce the quantity of times the serving end divides the image area and reduce the calculation amount of the serving end, when an image area that needs to be divided is not a first image area to be divided, the serving end may determine a target length value of a previous image area of the image area, and then the serving end may first divide the image area by using the target length value. When a percentage of hit image blocks in an image block subset obtained by dividing the image area by using the target length value is less than the target sub-threshold, the serving end may divide the image area by sequentially using the length values in the length value set in an order of the plurality of length values in the length value set. The length values in the length value set may be arranged in descending order of the hit ratios.

According to a second aspect, an image sending apparatus is provided, where the apparatus includes at least one module, and the at least one module is configured to implement the image sending method provided in any one of the first aspect or the optional manners of the first aspect.

According to a third aspect, an image sending apparatus is provided, where the apparatus includes a processor and a memory; and the processor is configured to execute an instruction stored in the memory, and the processor executes the instruction to implement the image sending method provided in any one of the first aspect or the optional manners of the first aspect.

According to a fourth aspect, a computer readable storage medium is provided, where the computer readable storage medium stores an instruction, and when the instruction is executed on a computer, the computer is enabled to perform the image sending method provided in any one of the first aspect or the optional manners of the first aspect.

According to a fifth aspect, a computer program product including an instruction is provided, where when the computer program product is run on a computer, the computer is enabled to perform the image sending method in any one of the first aspect or the possible implementations of the first aspect.

Beneficial effects of the technical solutions provided in this application are as follows:

The serving end divides the desktop image according to the image segmentation solution included in the image segmentation solution set, to obtain the target image block set meeting the target condition. Then the serving end sends the data information of each image block and the location information of each image block in the target image block set to the user end. The target condition includes: the percentage of the hit image blocks in the target image block set is greater than or equal to the target threshold, or the percentage of the hit image blocks in the target image block set is greater than the percentage of the hit image blocks in the another image block set. Therefore, it can be ensured that the percentage of the hit image blocks in the target image block set obtained by dividing the desktop image by the serving end is relatively high. The data information of the hit image block is the flag value of the hit image block, the data information of the missed image block is the image data of the missed image block, the image data may be the pixel values of the missed image block, and the data volume of the flag value is usually less than the data volume of the image data. Therefore, compared with the missed image block, smaller bandwidth is required by the serving end for sending the data information of the hit image block to the user end. Accordingly, the relatively high percentage of the hit image blocks in the target image block set obtained by dividing the desktop image by the serving end may help reduce the bandwidth between the serving end and the user end.

BRIEF DESCRIPTION OF DRAWINGS

FIG. 1A is a schematic diagram of a desktop image according to an embodiment of this application;

FIG. 1B is a schematic diagram of segmenting a desktop image according to an embodiment of this application;

FIG. 1C is a schematic diagram of a desktop image according to an embodiment of this application;

FIG. 1D is a schematic diagram of segmenting a desktop image according to an embodiment of this application;

FIG. 1E is a schematic diagram of a desktop image according to an embodiment of this application;

FIG. 1F is a schematic diagram of segmenting a desktop image according to an embodiment of this application;

DESCRIPTION OF EMBODIMENTS

Figure 1G:
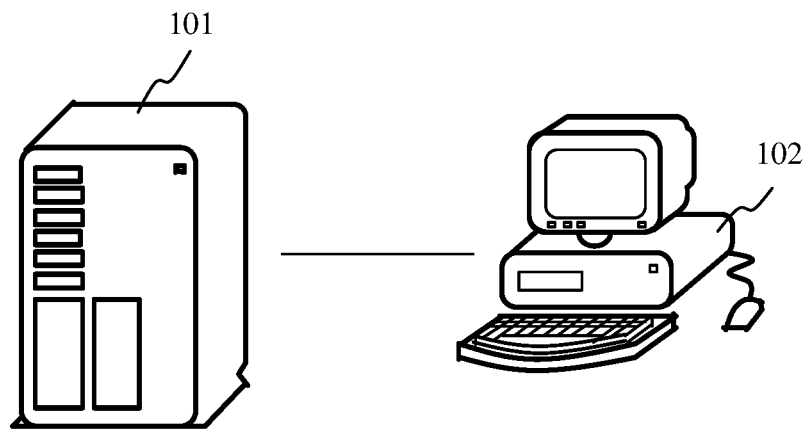
FIG. 1G is a schematic diagram of an implementation environment according to an embodiment of this application.

To make the objectives, technical solutions, and advantages of this application clearer, the following further describes implementations of this application in detail with reference to the accompanying drawings.

A VDI may implement remote access to a desktop. A typical architecture of the VDI may include a serving end and a user end. A virtual machine may be deployed on the serving end. A display protocol program and at least one application program may be installed in the virtual machine. The user end may access the virtual machine deployed on the serving end, and send an operation instruction to the virtual machine to use the application program installed in the virtual machine. After the operation instruction sent by the user end is received, the application program installed in the virtual machine may generate a desktop image based on the operation instruction. The display protocol program may obtain the desktop image, and send the desktop image to the user end by using an image caching technology, to implement remote access to the desktop.

For example, a word processing application may be installed in the virtual machine deployed on the serving end. In a process of using the word processing application, the user end may send, to the virtual machine, an operation instruction triggered by a user. The operation instruction may be an instruction for pasting a passage "A virtual desktop infrastructure is abbreviated to VDI, and may implement remote access to a desktop". After the operation instruction is received, the word processing application installed in the virtual machine may generate a desktop image based on the operation instruction. The desktop image may be an image shown in FIG. 1A. Then the display protocol program in the virtual machine may send the generated desktop image to the user end, and the user end may display the received desktop image, so that the user can intuitively see an operation result of the operation instruction triggered by the user, to implement remote access to the desktop.

For ease of description, the "serving end" is used as an execution body of all technical processes such as processes of receiving an operation instruction, generating a desktop image, and sending the desktop image to the user end by using the image caching technology. It should be understood that, in a possible specific implementation, the virtual machine deployed on the serving end receives an operation instruction sent by the user end, the application program installed in the virtual machine generates a desktop image, and a desktop protocol program installed in the virtual machine sends the desktop image to the user end by using the image caching technology.

To reduce bandwidth, when the serving end sends the desktop image to the user end, the image caching technology may be used. In the image caching technology, the serving end may segment a to-be-sent desktop image into a plurality of image blocks. For each image block, the serving end may perform calculation based on pixel values of all pixels in the image block and a preset algorithm (for example, a hash algorithm) to obtain a flag value corresponding to the image block. Before sending each image block to the user end, the serving end may query a cache of the serving end based on the flag value of the image block. When the flag value of the image block is not stored in the cache of the serving end, it indicates that the serving end sends the image block to the user end for the first time. In this case, the serving end may send the pixel values of the image block and the flag value of the image block together to the user end, and store the flag value of the image block in the cache of the serving end. In a possible implementation, the serving end may encode the pixel values of the image block, and send the encoded pixel values to the user end. After receiving the pixel values of the image block and the flag value of the image block, the user end may display the image block based on the pixel values of the image block, and the user end may further correspondingly store the pixel values of the image block and the flag value of the image block in a cache of the user end. When the flag value of the image block is stored in the cache of the serving end, it indicates that the serving end has previously sent the image block to the user end. In this case, the serving end may send only the flag value of the image block to the user end. After receiving the flag value of the image block, the user end may obtain, from a cache of the user end through querying based on the flag value, the pixel values corresponding to the flag value, and then the user end may display the image block based on the pixel values corresponding to the flag value. In the image caching technology, for an image block that has been sent to the user end, the serving end needs to send only a flag value of the image block to the user end. Therefore, a data volume of data sent by the serving end to the user end can be greatly reduced, thereby reducing bandwidth between the serving end and the user end.

For example, in the image caching technology, when the serving end needs to send the desktop image shown in FIG. 1A to the user end, as shown in FIG. 1B, the serving end may segment the desktop image into 10 image blocks, and then the serving end may separately calculate flag values of the 10 image blocks. When none of the flag values of the 10 image blocks are stored in the cache of the serving end, for each of the 10 image blocks, the serving end sends pixel values and a flag value of the image block together to the user end, and stores the flag value of the image block in the cache of the serving end. After receiving the flag values and pixel values of the 10 image blocks, the user end may separately display the 10 image blocks based on the pixel values of the 10 image blocks, and separately store the flag values and the pixel values of the 10 image blocks in the cache of the user end. Afterwards, the user end may continue to send, to the serving end, an operation instruction triggered by the user. The operation instruction may be an instruction for pasting a text fragment "is widely applied". After receiving the operation instruction that the user end continues to send, the serving end may generate, based on the operation instruction, a desktop image shown in FIG. 1C. When sending the desktop image shown in FIG. 1C, as shown in FIG. 1D, the serving end may also segment the desktop image into 10 image blocks, and separately calculate flag values of the 10 image blocks. As shown in FIG. 1D, first six image blocks of the 10 image blocks are image blocks that have been sent by the serving end to the user end. Therefore, flag values of the first six image blocks are stored in the cache of the serving end. In this case, the serving end may send only the flag values of the first six image blocks to the user end. In addition, because the serving end sends last four image blocks to the user end for the first time, flag values of the last four image blocks are not stored in the cache of the serving end. In this case, the serving end needs to send pixel values and the flag values of the last four image blocks together to the user end, and store the flag values of the last four image blocks in the cache of the serving end.

It can be learned based on the foregoing descriptions that a higher percentage of hit image blocks in a plurality of image blocks obtained by segmenting a desktop image indicates smaller bandwidth required by the serving end for sending the desktop image to the user end. A hit image block is an image block whose corresponding flag value is stored in the cache of the serving end. Therefore, for the image caching technology, segmenting the desktop image to obtain a relatively high percentage of hit image blocks is an important link to reduce bandwidth between the serving end and the user end.

In a related technology, the serving end may segment the desktop image according to a fixed segmentation solution. For example, the serving end may segment the desktop image into a plurality of 64×64 image blocks by using a vertex in an upper left corner as a segmentation starting point. In FIG. 1B and FIG. 1D, the serving end segments the desktop image according to the fixed segmentation solution.

However, when the desktop image is segmented according to the fixed segmentation solution, in many cases, it is difficult to ensure a percentage of hit image blocks. Therefore, relatively large bandwidth is required for communication between the serving end and the user end. For example, when a desktop image that currently needs to be sent translates compared with a sent desktop image, a plurality of image blocks obtained by segmenting, according to the fixed segmentation solution, the desktop image that currently needs to be sent are all likely to be different from a plurality of image blocks obtained by segmenting the sent desktop image. In this case, relatively large bandwidth is occupied by the serving end and the user end to transmit different image blocks.

As shown in FIG. 1D, when the serving end sends the desktop image (which is referred to as a first desktop image below) shown in FIG. 1C to the user end, the serving end may segment the first desktop image according to the fixed segmentation solution to obtain the 10 image blocks, and then the serving end may send, to the user end, the 10 image blocks obtained through segmentation. After the serving end sends the first desktop image to the user end, the serving end may further send a desktop image (which is referred to as a second desktop image below) shown in FIG. 1E to the user end. The second desktop image translates upwards compared with the first desktop image. When sending the second desktop image, the serving end may segment the second desktop image according to a fixed segmentation solution (the fixed segmentation solution is the same as the fixed segmentation solution shown in FIG. 1B) shown in FIG. 1F, to obtain 10 image blocks. As shown in FIG. 1D and FIG. 1F, the 10 image blocks obtained through segmentation in FIG. 1D are all different from the 10 image blocks obtained through segmentation in FIG. 1F. In other words, no hit image block exists in the 10 image blocks obtained by segmenting the second desktop image. In this case, the serving end needs to send, to the user end, all flag values and pixel values of the 10 image blocks obtained by segmenting the second desktop image. Consequently, relatively large bandwidth is required for communication between the serving end and the user end.

An embodiment of this application provides an image sending method. According to the image sending method, a percentage of hit image blocks in a plurality of image blocks obtained by segmenting a desktop image can be increased, so that bandwidth between a serving end and a user end can be reduced. FIG. 1G is a schematic diagram of an implementation environment used in an image sending method according to an embodiment of this application. As shown in FIG. 1G, the implementation environment may include a serving end 101 and a user end 102. A virtual machine is deployed on the serving end 101, and a VDI client may be installed on the user end 102. The serving end 101 may be a server, or may be another computing device on which a virtual machine can be deployed. The user end 102 may be an electronic device such as a desktop computer, a tablet computer, or a mobile phone. The user end 102 may access, by using the VDI client installed on the user end 102, the virtual machine deployed on the serving end 101.

Figure 2A:
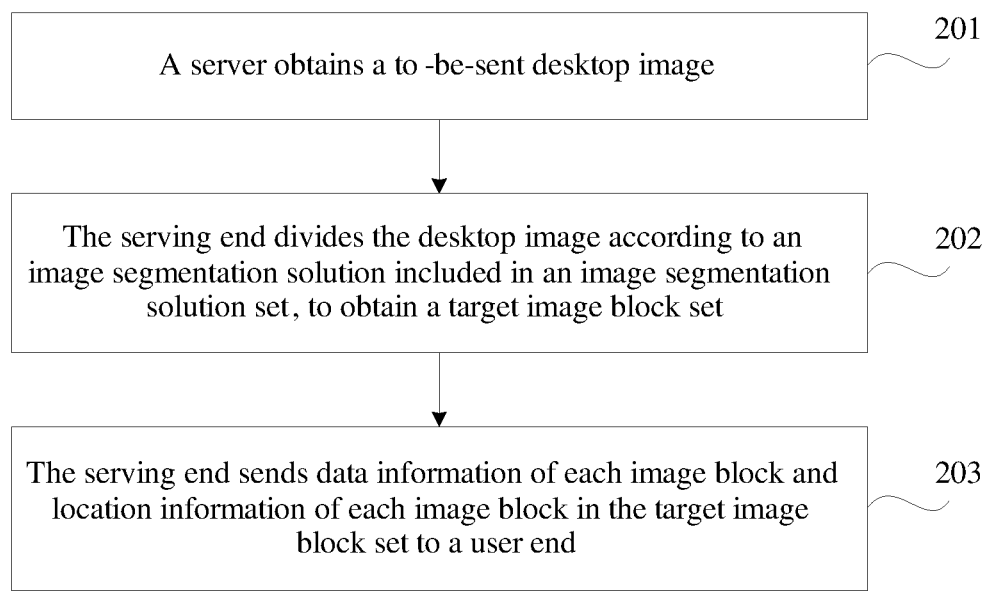
FIG. 2A is a flowchart of an image sending method according to an embodiment of this application.

FIG. 2A is a flowchart of an image sending method according to an embodiment of this application. The image sending method may be applied to the implementation environment shown in FIG. 1G. As shown in FIG. 2A, the image sending method may include the following steps.

Step 201: A serving end obtains a to-be-sent desktop image.

As described above, in a VDI architecture, a virtual machine deployed on the serving end may receive an operation instruction sent by a user end, and an application program that is in the virtual machine and to which the operation instruction points may generate a desktop image based on the operation instruction. In step 201, a display protocol program installed in the virtual machine may use the generated desktop image as the to-be-sent desktop image, to send the desktop image to the user end in a subsequent step by using an image caching technology.

It should be noted that the desktop image obtained by the serving end may be an entire image or a local image in the entire image. The entire image is a desktop image whose image size is the same as a size of a user end screen. After receiving the entire image, the user end may replace, based on the entire image, a desktop image that is currently displayed by the user end. The local image is a desktop image whose image size is less than the size of the user end screen. After receiving the local image, the user end may update, based on the local image, a partial area of the desktop image that is currently displayed by the user end.

Figure 2B:
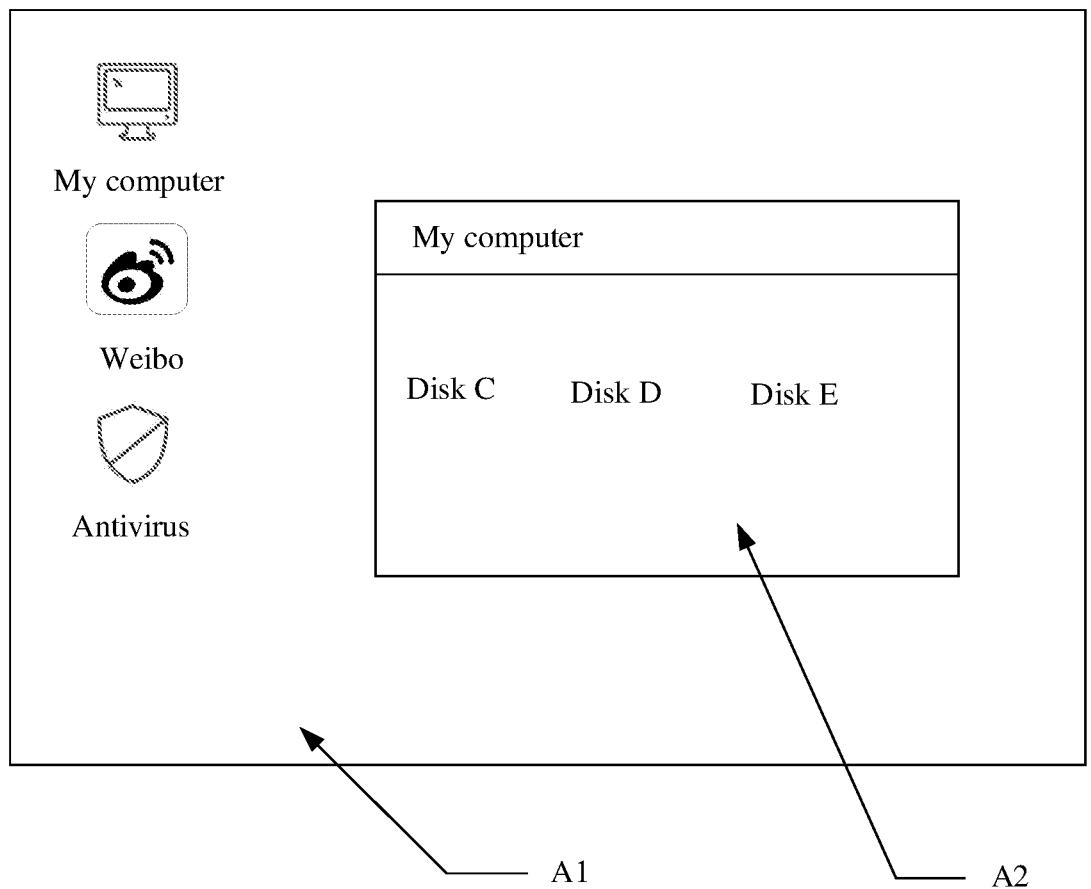
FIG. 2B is a schematic diagram of a desktop image according to an embodiment of this application.

For example, the entire image may be an image in a dashed-line box A1 in FIG. 2B, and the size of the entire image is the same as the size of the user end screen; and the local image may be an image in a dashed-line box A2 in FIG. 2B, and the size of the local image is less than the size of the user end screen.

Step 202: The serving end divides the desktop image according to an image segmentation solution included in an image segmentation solution set, to obtain a target image block set.

After obtaining the desktop image, the serving end may obtain the image segmentation solution set. The image segmentation solution set may include at least two image segmentation solutions different from each other. Optionally, the image segmentation solutions in the image segmentation solution set may be arranged in descending order of priorities. In a possible implementation, the priorities of the image segmentation solutions in the image segmentation solution set may be in a positive correlation with range magnitudes of scenarios to which the image segmentation solutions are applicable. For example, the image segmentation solutions in the image segmentation solution set may be arranged in descending order of the range magnitudes of the applicable scenarios.

After obtaining the image segmentation solution set, the display protocol program in the virtual machine deployed on the serving end may divide the desktop image sequentially according to each image segmentation solution in the image segmentation solution set. The serving end may obtain an image block set after dividing the desktop image according to each image segmentation solution. The image block set may include a plurality of image blocks obtained after the serving end divides the desktop image according to the image segmentation solution. Each of the plurality of image blocks may be a hit image block or a missed image block. The missed image block is an image block whose corresponding flag value is not stored in a cache of the serving end.

The serving end divides the desktop image sequentially according to each image segmentation solution in the image segmentation solution set to obtain the image block set. Each time an image block set is obtained through division according to an image segmentation solution, the serving end determines whether the image block set meets a target condition. If the image block set meets the target condition, the image block set is used as the target image block set. If the image block set does not meet the target condition, an image segmentation solution arranged after the image segmentation solution in the image segmentation solution set is selected to divide the desktop image, until a target image block set meeting the target condition is found. Optionally, when the target image block set meeting the target condition is found, the serving end may stop continuing dividing the desktop image by using another image segmentation solution in the image segmentation solution set.

Optionally, the target condition includes: a percentage of hit image blocks in the target image block set is greater than or equal to a target threshold; or a percentage of hit image blocks in the target image block set is greater than a percentage of hit image blocks in another image block set, and the another image block set is obtained by dividing the desktop image according to another image segmentation solution included in the image segmentation solution set.

A technical process in which the serving end finds the target image block set according to the image segmentation solution in the image segmentation solution set may include step A1 and step B1.

A1. The serving end divides the desktop image by sequentially using the image segmentation solutions in the image segmentation solution set in an order in which the image segmentation solutions are arranged in the image segmentation solution set, until a first stop condition is met.

Each image segmentation solution in the image segmentation solution set includes one area division manner, and area division manners included in different image segmentation solutions are different. That the serving end divides the desktop image according to an image segmentation solution in the image segmentation solution set may include: dividing, by the serving end, the desktop image into a plurality of image areas along a first direction in an area division manner included in the image segmentation solution; and then for each image area, dividing, by the serving end, the image area into at least one image block. The first direction may be a row direction or a column direction in a screen coordinate system of the user end.

The first stop condition may be a condition that a percentage of hit image blocks in an image block set obtained by dividing the desktop image by the serving end according to an image segmentation solution in the image segmentation solution set is greater than or equal to the target threshold. It should be noted that the "percentage of the hit image blocks" herein is a percentage of a quantity of hit image blocks in the image block set in a quantity of all image blocks in the image block set. Alternatively, the first stop condition may be a condition that the serving end divides the desktop image by using up all the image segmentation solutions in the image segmentation solution set.

B1. The serving end determines a target image segmentation solution and the target image block set.

When the first stop condition is met, the serving end may stop dividing the desktop image, and determine, from at least one image block set obtained through division, the target image block set meeting the target condition. In addition, the serving end may further determine an image segmentation solution used to perform division to obtain the target image block set. The image segmentation solution is the target image segmentation solution described above.

If the first stop condition is the condition that a percentage of hit image blocks in an image block set obtained by dividing the desktop image by the serving end according to an image segmentation solution in the image segmentation solution set is greater than or equal to the target threshold, the image block set obtained through division according to the image segmentation solution meets the target condition. Therefore, the serving end may determine, as the target image block set, the image block set obtained by dividing the desktop image according to the image segmentation solution, and determine the image segmentation solution as the target image segmentation solution.

If the first stop condition is the condition that the serving end divides the desktop image by using up all the image segmentation solutions (the at least two image segmentation solutions different from each other) in the image segmentation solution set, the serving end may determine a percentage of hit image blocks in each image block set obtained through division. An image block set with a highest percentage of hit image blocks meets the target condition. Therefore, the serving end may determine, as the target image block set, an image block set with a highest percentage of hit image blocks in at least two image block sets obtained by dividing the desktop image according to all the image segmentation solutions in the image segmentation solution set, and determine, as the target image segmentation solution, an image segmentation solution corresponding to the target image block set.

For example, the image segmentation solution set may include three image segmentation solutions that are arranged in an order and that are respectively an image segmentation solution a, an image segmentation solution b, and an image segmentation solution c. The serving end may sequentially divide the desktop image in the order in which the image segmentation solutions are arranged in the image segmentation solution set, until the first stop condition is met, and determine the target image segmentation solution and the target image block set. To be specific, the serving end may first divide the desktop image according to the image segmentation solution a, and the first stop condition is met when a percentage of hit image blocks in an image block set obtained by dividing the desktop image by the serving end according to the image segmentation solution a is greater than or equal to the target threshold. In this case, the image segmentation solution a may be determined as the target image segmentation solution, and the target image block set is the image block set obtained by dividing the desktop image according to the image segmentation solution a. In this case, the serving end no longer needs to divide the desktop image according to the image segmentation solution b and the image segmentation solution c. The first stop condition is not met when the percentage of the hit image blocks in the image block set obtained by dividing the desktop image by the serving end according to the image segmentation solution a is less than the target threshold. In this case, the serving end may divide the desktop image according to the image segmentation solution b. The first stop condition is met when a percentage of hit image blocks in an image block set obtained by dividing the desktop image by the serving end according to the image segmentation solution b is greater than or equal to the target threshold. In this case, the image segmentation solution b is determined as the target image segmentation solution, and the target image block set is the image block set obtained by dividing the desktop image according to the image segmentation solution b. In this case, the serving end no longer needs to divide the desktop image according to the image segmentation solution c. The first stop condition is not met when the percentage of the hit image blocks in the image block set obtained by dividing the desktop image by the serving end according to the image segmentation solution b is less than the target threshold. In this case, the serving end may divide the desktop image according to the image segmentation solution c. The first stop condition is met because the serving end divides the desktop image by using up all the image segmentation solutions in the image segmentation solution set in this case. In this case, the serving end may select, as the target image block set, an image block set with a highest percentage of hit image blocks from the three image block sets corresponding to the three image segmentation solutions (the image segmentation solution a, the image segmentation solution b, and the image segmentation solution c), and correspondingly use, as the target image segmentation solution, an image segmentation solution corresponding to the target image block set.

In this way, it can be ensured that the percentage of the hit image blocks in the target image block set that is finally determined by the serving end is relatively high. Therefore, bandwidth between the serving end and the user end can be reduced in a subsequent step of sending the desktop image to the user end based on the target image block set.

This embodiment of this application provides an example of an image segmentation solution set. The image segmentation solution set may include three image segmentation solutions. The three image segmentation solutions are respectively an instruction origin segmentation solution, a static location segmentation solution, and a motion prediction segmentation solution. When an instruction origin of a to-be-sent desktop image does not change compared with an instruction origin of a sent desktop image, a percentage of hit image blocks in an image block set obtained by dividing the to-be-sent desktop image based on the instruction origin segmentation solution is relatively high. When the instruction origin of the to-be-sent desktop image changes compared with the instruction origin of the sent desktop image, a percentage of hit image blocks in an image block set obtained by dividing the to-be-sent desktop image according to each of the static location segmentation solution and the motion prediction segmentation solution is relatively high. The instruction origin of the desktop image may be a vertex of a bounding rectangle (which may also be referred to as a minimum circumscribed rectangle) of the desktop image. For example, the desktop image may be a rectangular image, the bounding rectangle of the desktop image may be a rectangle formed by boundaries of the desktop image, and the instruction origin of the desktop image may be a vertex in an upper left corner of the bounding rectangle of the desktop image.

In a possible implementation, in the example of the image segmentation solution set, the instruction origin segmentation solution, the static location segmentation solution, and the motion prediction segmentation solution are arranged in descending order of priorities. For example, the instruction origin segmentation solution has a highest priority, and the motion prediction segmentation solution has a lowest priority.

Technical processes in which the serving end divides the desktop image according to the three image segmentation solutions are separately described below in this embodiment of this application.

1. A technical process in which the serving end divides the desktop image according to the instruction origin segmentation solution to obtain an image block set may include step A2, step B2, step C2, and step D2.

A2. The serving end determines an instruction origin of the desktop image.

The serving end may determine a location of the instruction origin of the desktop image in the screen coordinate system of the user end.

B2. The serving end divides the desktop image into a plurality of image areas along the first direction in an area division manner included in the instruction origin segmentation solution.

The first direction is parallel to a side of the bounding rectangle of the desktop image. In this embodiment of this application, an example in which the first direction is the row direction is merely used for description. A case in which the first direction is the column direction is similar to a case in which the first direction is the row direction. Details are not described herein in this embodiment of this application.

Optionally, the area division manner included in the instruction origin segmentation solution is: segmenting the desktop image into the plurality of image areas by using the instruction origin of the desktop image as a segmentation starting point. Each image area is a rectangular area, and the plurality of image areas are sequentially arranged along the first direction.

A length k1, in the first direction, of each of the plurality of image areas except a last image area is equal, and is equal to a first preset segmentation length L. A length k2 of the last image area in the first direction meets a first formula, and the first formula is k2=N−y1× k1, where y1=⌈N/k1⌉−1, N is a total length of the desktop image in the first direction, and ⌈ ⌉ indicates rounding up.

It should be noted that the first preset segmentation length L may be a length of a macroblock in the first direction, and the first preset segmentation length L is an integer multiple of a length of a single pixel in the first direction. The macroblock is an image block having a maximum default size in the image encoding/decoding field. During actual application, the macroblock may be a quadrate image block. It should be further noted that the last image area is an image area that is farthest away from the instruction origin of the desktop image in the first direction and that is in the plurality of image areas obtained by segmenting the desktop image.

It can be learned from the first formula that, when the total length N of the desktop image in the first direction is an integer multiple of the first preset segmentation length L, the length of the last image area in the first direction is equal to the first preset segmentation length L. When the total length N of the desktop image in the first direction is not an integer multiple of the first preset segmentation length L, the length of the last image area in the first direction is equal to a remainder obtained by dividing the total length N of the desktop image in the first direction by the first preset segmentation length L.

Figure 2C:
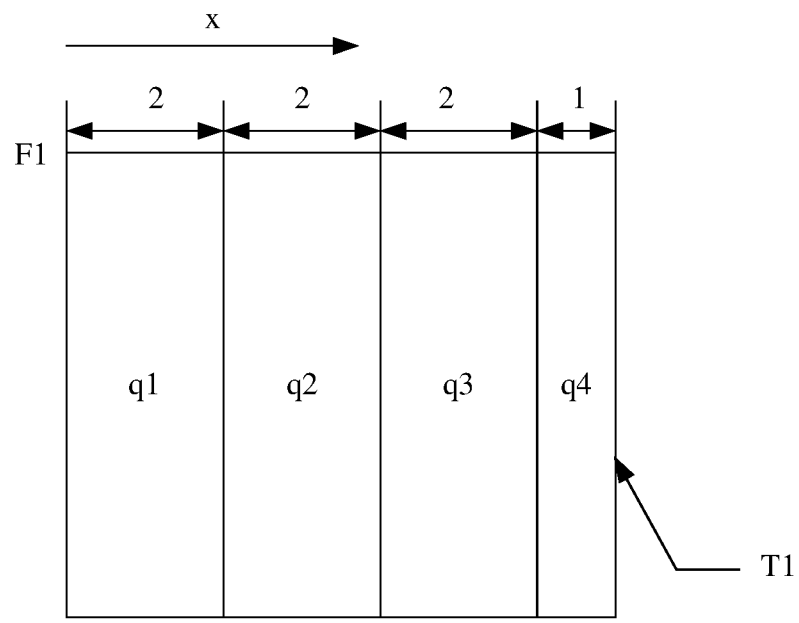
FIG. 2C is a schematic diagram of segmenting a desktop image according to an embodiment of this application.

For example, as shown in FIG. 2C, a length of a desktop image T1 in the first direction (namely, a row direction x) is 7, and the first preset segmentation length L is 2. In this case, according to the first formula, y1=⌈7/2⌉−1=3, and k2=7−y1×2=1. The serving end may segment, by using an instruction origin F1 of the desktop image T1 as a segmentation starting point, the desktop image T1 into four image areas q1, q2, q3, and q4 that are sequentially arranged along the first direction. Lengths of the first three image areas q1, q2, and q3 in the first direction are all equal to 2, and a length of the last image area q4 in the first direction is equal to 1.

Figure 2D:
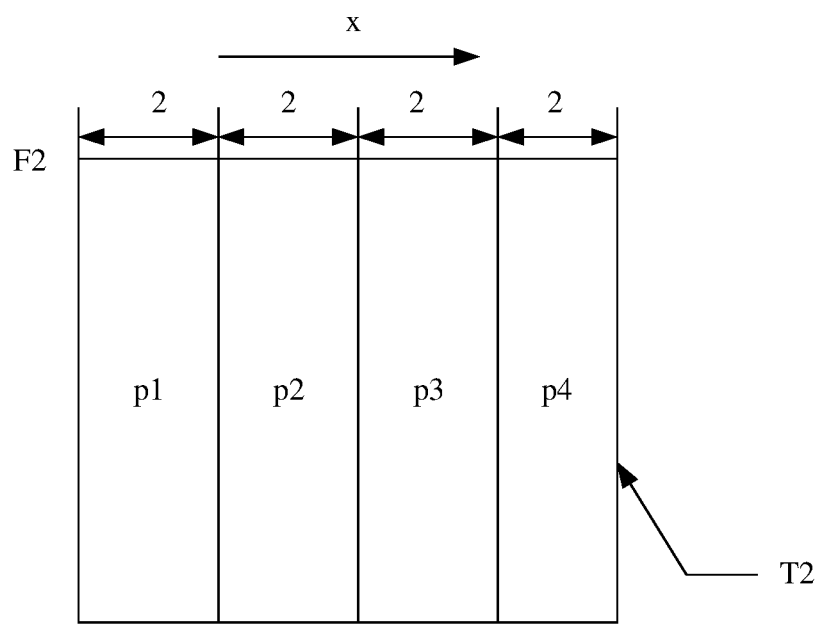
FIG. 2D is a schematic diagram of segmenting a desktop image according to an embodiment of this application.

For another example, as shown in FIG. 2D, a length of a desktop image T2 in the first direction (namely, a row direction x) is 8, and the first preset segmentation length L is 2. In this case, according to the first formula, y1=⌈8/2⌉−1=3, and k2=8−y1×2=2. The serving end may segment, by using an instruction origin F2 of the desktop image T2 as a segmentation starting point, the desktop image T2 into four image areas p1, p2, p3, and p4 that are sequentially arranged along the first direction. Lengths of the first three image areas p1, p2, and p3 in the first direction are all equal to 2, and a length of the last image area p4 in the first direction is also equal to 2.

In the instruction origin segmentation solution, the serving end may segment the desktop image based on a preset step (namely, the first preset segmentation length L) by using the instruction origin of the desktop image as the segmentation starting point. Therefore, when an instruction origin of a to-be-sent desktop image does not change compared with an instruction origin of a sent desktop image, there is a relatively high probability that a plurality of image areas obtained by segmenting the to-be-sent desktop image according to the instruction origin segmentation solution coincide with a plurality of image areas obtained by segmenting the sent desktop image according to the instruction origin segmentation solution, and in a subsequent step, there is accordingly a relatively high percentage of hit image blocks in an image block set obtained by segmenting the plurality of image areas of the to-be-sent desktop image. In this way, bandwidth between the serving end and the user end can be reduced.

C2. The serving end determines a target image block subset for each of the plurality of image areas obtained by dividing the desktop image.

For each image area, the serving end may obtain a block segmentation solution set. The block segmentation solution set includes a plurality of block segmentation solutions different from each other. The serving end may divide the image area according to at least one block segmentation solution in the block segmentation solution set. The serving end may obtain an image block subset after dividing the image area according to each block segmentation solution in the block segmentation solution set. The image block subset may include a plurality of image blocks obtained after the serving end divides the image area according to the block segmentation solution.

The serving end divides the image area sequentially according to each block segmentation solution in the block segmentation solution set to obtain at least one image block subset. Each time an image block subset is obtained through division according to a block segmentation solution, the serving end determines whether the image block subset meets a target sub-condition. If the image block subset meets the target sub-condition, the image block subset is used as the target image block subset. If the image block subset does not meet the target sub-condition, a block segmentation solution arranged after the block segmentation solution in the block segmentation solution set is selected to divide the image area, until a target image block subset meeting the target sub-condition is found. Optionally, when the target image block subset meeting the target sub-condition is found, the serving end may stop continuing dividing the image area by using another block segmentation solution in the block segmentation solution set.

Optionally, the target sub-condition includes: a percentage of hit image blocks in the target image block subset is greater than or equal to a target sub-threshold; or a percentage of hit image blocks in the target image block subset is greater than a percentage of hit image blocks in another image block subset, and the another image block subset is obtained by dividing the image area according to another block segmentation solution included in the block segmentation solution set.

For each image area, a technical process in which the serving end finds the target image block subset according to the block segmentation solution in the block segmentation solution set may include step a, step b, and step c.

a. The serving end obtains a length value set.

The length value set includes a plurality of length values arranged in an order, each length value is less than or equal to a second preset segmentation length L', and each length value is an integer multiple of a length a' of a single pixel in a second direction. Each length value in the length value set corresponds to one block segmentation solution in the block segmentation solution set, and is used in the corresponding block segmentation solution.

The second preset segmentation length L' may be a length of a macroblock in the second direction, and the second preset segmentation length L' is an integer multiple of the length a' of the single pixel in the second direction. The second direction may be perpendicular to the first direction. For example, the first direction is a row direction, and the second direction is a column direction. For another example, the first direction is a column direction, and the second direction is a row direction.

b. The serving end divides the image area by sequentially using the block segmentation solutions in the block segmentation solution set in an order in which the block segmentation solutions are arranged in the block segmentation solution set, until a second stop condition is met.

It should be noted that the order in which the plurality of block segmentation solutions are arranged in the block segmentation solution set corresponds to the order in which the plurality of length values are arranged in the length value set. To be specific, in step b, the serving end may divide the image area by sequentially using the length values in the length value set in the order in which the length values are arranged in the length value set, until the second stop condition is met.

A technical process in which the serving end divides the image area by using a length value R1 in the length value set, to obtain an image block subset may include the following step b11:

b11. The serving end segments, by using the length value R1, the image area into a plurality of image blocks that are sequentially arranged along the second direction, and uses the plurality of image blocks to form the image block subset.

A length p2, in the second direction, of a first image block in the plurality of image blocks is equal to the length value R1; a length p1, in the second direction, of each of the plurality of image blocks except the first image block and a last image block is equal to the second preset segmentation length L'; a length p3 of the last image block in the second direction meets a second formula; and the second formula is z× p1+p2+p3=M, where z=⌈(M−p2)/p1⌉−1, M is a total length of the desktop image in the second direction, and ⌈ ⌉ indicates rounding up.

It should be noted that the first image block is an image block that is closest to the instruction origin of the desktop image in the second direction and that is in the plurality of image blocks obtained by segmenting the image area, and the last image block is an image block that is farthest away from the instruction origin of the desktop image in the second direction and that is in the plurality of image blocks obtained by segmenting the image area.

It can be learned from the second formula that, when a difference between the total length M of the desktop image in the second direction and the length value R1 is an integer multiple of the second preset segmentation length L', the length of the last image block in the second direction is equal to the second preset segmentation length L'. When a difference between the total length M of the desktop image in the second direction and the length value R1 is not an integer multiple of the second preset segmentation length L', the length of the last image block in the second direction is equal to a remainder obtained by dividing the difference between the total length M of the desktop image in the second direction and the length value R1 by the second preset segmentation length L'.

Figure 2E:
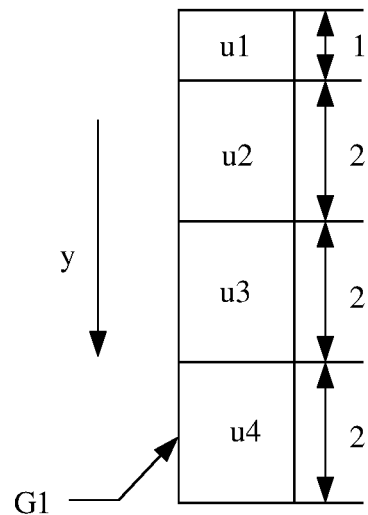
FIG. 2E is a schematic diagram of segmenting an image area according to an embodiment of this application.

For example, as shown in FIG. 2E, a length of an image area G1 in the second direction (namely, a column direction y) is 7, the second preset segmentation length L' is 2, and the length value R1 is 1. In this case, according to the second formula, z=⌈(7−1)/2⌉−1=2, 2×2+1+p3=7, and p3=2. The serving end may segment the image area G1 into four image blocks u1, u2, u3, and u4 that are sequentially arranged along the second direction. A length of the first image block u1 in the second direction is equal to 1, lengths of the two intermediate image blocks u2 and u3 in the second direction are both equal to 2, and a length of the last image block u4 in the second direction is also equal to 2.

Figure 2F:
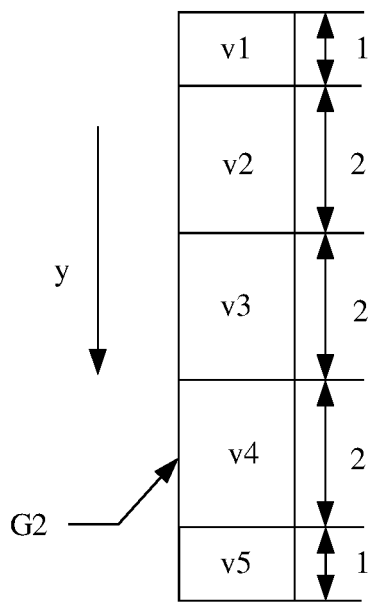
FIG. 2F is a schematic diagram of segmenting an image area according to an embodiment of this application.

For another example, as shown in FIG. 2F, a length of an image area G2 in the second direction (namely, a column direction y) is 8, the second preset segmentation length L' is 2, and the length value R1 is 1. In this case, according to the second formula, z=⌈(8−1)/2⌉−1=3, 3×2+1+p3=8, and p3=1. The serving end may segment the image area G2 into five image blocks v1, v2, v3, v4, and v5 that are sequentially arranged along the second direction. A length of the first image block v1 in the second direction is equal to 1, lengths of the three intermediate image blocks v2, v3, and v4 in the second direction are all equal to 2, and a length of the last image block v5 in the second direction is equal to 1.

After obtaining the image block subset by performing step b11, the serving end may further calculate a flag value of each image block in the image block subset, to determine a percentage of hit image blocks in the image block subset based on the flag value of each image block. Optionally, for each image block in the image block subset, the serving end may determine a plurality of image sub-blocks forming the image block. A length of each image sub-block in the first direction is equal to the first preset segmentation length L, and a length of each image sub-block in the second direction is equal to the length a' of the single pixel in the second direction. For each image block in the image block subset, the serving end may obtain a flag value of each image sub-block forming the image block. The flag value of each image sub-block may be obtained by the serving end through calculation based on pixel values of all pixels in the image sub-block and a preset algorithm (for example, a hash algorithm). Then for each image block in the image block subset, the serving end may perform calculation based on the preset algorithm (for example, a hash algorithm) and the flag value of each image sub-block forming the image block, to obtain the flag value of the image block. After obtaining the flag value of each image block in the image block subset through the calculation, the serving end may query the cache of the serving end based on the flag value of each image block, to determine the percentage of the hit image blocks in the image block subset.

Figure 2G:
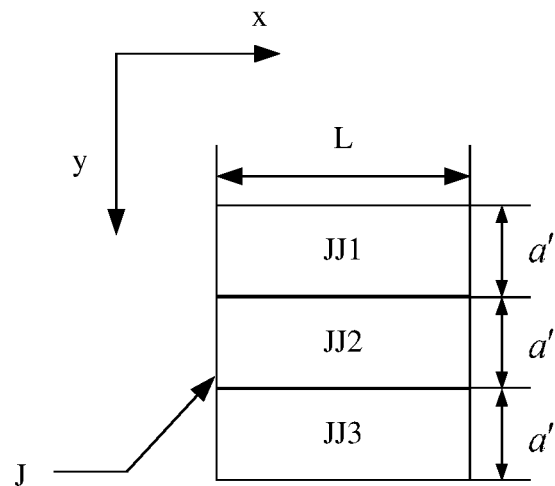
FIG. 2G is a schematic diagram of a plurality of image sub-blocks included in an image block according to an embodiment of this application.

For example, as shown in FIG. 2G, for an image block J in the image block subset, the serving end may determine three image sub-blocks JJ1, JJ2, and JJ3 forming the image block J. A length of each image sub-block in the first direction (namely, a row direction x) is equal to the first preset segmentation length L, and a length of each image sub-block in the second direction (namely, a column direction y) is equal to the length a' of the single pixel in the second direction. Then the serving end may obtain flag values Wjj1, Wjj2, and Wjj3 of the three image sub-blocks JJ1, JJ2, and JJ3, and the serving end may perform calculation based on the flag values Wjj1, Wjj2, and Wjj3 and the preset algorithm to obtain a flag value of the image block J. After obtaining the flag value of the image block J through the calculation, the serving end may query the cache of the serving end based on the flag value, to determine whether the image block J is a hit image block.

As described above, the serving end may divide the image area by sequentially using the length values in the length value set in the order in which the length values are arranged in the length value set, until the second stop condition is met. In this embodiment of this application, the second stop condition may be a condition that a percentage of hit image blocks in an image block subset obtained by dividing the image area by the serving end based on a length value in the length value set is greater than or equal to the target sub-threshold. Alternatively, the second stop condition may be a condition that the serving end divides the image area by using up all the length values in the length value set.

For example, when the length value set includes three length values R1, R2, and R3 that are arranged in an order, the serving end may divide the image area by sequentially using the length values R1, R2, and R3. The second stop condition is met when a percentage of hit image blocks in an image block subset obtained by dividing the image area by the serving end by using a length value is greater than or equal to the target sub-threshold. For example, the length value may be R2. In this case, the serving end may no longer continue dividing the image area. Alternatively, the second stop condition is met when the serving end divides the image area by using the length values R1, R2, and R3. In this case, the serving end no longer continues dividing the image area.

c. The serving end determines the target image block subset and a target block segmentation solution.

When the second stop condition is met, the serving end may stop dividing the image area, and determine, from at least one image block subset obtained through division, the target image block subset meeting the target sub-condition. In addition, the serving end may further determine a block segmentation solution used to perform division to obtain the target image block subset. The block segmentation solution is the target block segmentation solution described above.

If the second stop condition is the condition that a percentage of hit image blocks in an image block subset obtained by dividing the image area by the serving end by using a length value in the length value set is greater than or equal to the target sub-threshold, the image block subset obtained through division by using the length value meets the target sub-condition. Therefore, the serving end may determine, as the target image block subset, the image block subset obtained by dividing the image area by using the length value, and determine, as the target block segmentation solution, a block segmentation solution corresponding to the length value.

If the second stop condition is the condition that the serving end divides the image area by using up all the length values in the length value set, the serving end may determine a percentage of hit image blocks in each image block subset obtained through division. An image block subset with a highest percentage of hit image blocks meets the target sub-condition. Therefore, the serving end may determine, as the target image block subset, an image block subset with a highest percentage of hit image blocks in a plurality of image block subsets obtained by dividing the image area by using up all the length values in the length value set, and determine, as the target block segmentation solution, a block segmentation solution corresponding to the target image block subset.

Optionally, the length value correspondingly used to obtain the target image block subset through division may be usually referred to as a target length value.

For example, when the length value set includes three length values R1, R2, and R3 that are arranged in an order, the serving end may divide the image area by sequentially using the length values R1, R2, and R3. The second stop condition is met when a percentage of hit image blocks in an image block subset obtained by dividing the image area by the serving end by using a length value is greater than or equal to the target sub-threshold. For example, the length value may be R2. In this case, the serving end may no longer continue dividing the image area, and may determine, as the target image block subset, the image block subset obtained by dividing the image area by using the length value R2, and determine, as the target block segmentation solution, a block segmentation solution corresponding to the length value R2. The length value R2 is the target length value. Alternatively, the second stop condition is met when the serving end separately divides the image area by using the length values R1, R2, and R3. In this case, the serving end no longer continues dividing the image area, but determines, as the target image block subset, an image block subset with a highest percentage of hit image blocks (for example, the image block subset with the highest percentage of the hit image blocks may be an image block subset obtained by dividing the image area by using the length value R3) in three image block subsets obtained by dividing the image area by using the length values R1, R2, and R3, and determines, as the target block segmentation solution, a block segmentation solution corresponding to the length value R3. The length value R3 is the target length value.

When the second stop condition is the condition that a percentage of hit image blocks in an image block subset obtained by dividing the image area by the serving end based on a length value in the length value set is greater than or equal to the target sub-threshold, the serving end does not need to divide the image area by using up all the length values in the length value set. Therefore, a calculation amount of the serving end is relatively small. In addition, the serving end may determine, as the target image block subset, the image block subset whose percentage of hit image blocks is greater than or equal to the target sub-threshold. Therefore, it can be ensured that the percentage of the hit image blocks in the target image block subset is relatively high, so that bandwidth between the serving end and the user end can be reduced to some extent. When the second stop condition is the condition that the serving end divides the image area by using up all the length values in the length value set, the serving end may determine, as the target image block subset, an image block subset with a highest percentage of hit image blocks in the at least one image block subset. In other words, the percentage of the hit image blocks in the target image block subset determined by the serving end is highest. Therefore, in this case, bandwidth between the serving end and the user end can be reduced to an utmost extent.

It can be learned from the foregoing descriptions that, in a process of dividing the image area, the serving end may use at least one different length value as the length of the first image block in the second direction to perform segmentation to obtain the first image block, and then the serving end may segment another portion of the image area based on a fixed step (namely, the second preset segmentation length) to obtain the last image block and other image blocks different from the first image block and the last image block. In other words, the serving end may segment the image area based on the fixed step by using the first image block as the segmentation starting point. In this way, when a to-be-sent desktop image translates compared with a sent desktop image, the serving end may divide an image area of the to-be-sent desktop image at least once, to search for a possible translation length of the to-be-sent desktop image. The possible translation length is a length of a first image block in the second direction. When the second stop condition is met, it indicates that the serving end finds a possible translation length. In this case, there is a relatively high possibility that other image blocks in an obtained target image block subset except the first image block and a last image block coincide with image blocks obtained by segmenting the sent desktop image. Therefore, a percentage of hit image blocks in a plurality of image blocks included in the target image block subset is relatively high.

It should be noted that, when the second stop condition is the condition that a percentage of hit image blocks in an image block subset obtained by dividing the image area by the serving end based on a length value in the length value set is greater than or equal to the target sub-threshold, a more forward location of the length value arranged in the length value set indicates a smaller quantity of times the serving end divides the image area and a smaller calculation amount of the serving end. For example, the length value set may include three length values R1, R2, and R3. The second stop condition is met when a percentage of hit image blocks in an image block subset obtained by dividing the image area by the serving end by using the length value R2 is greater than or equal to the target sub-threshold. When R2 is arranged in a first place in the length value set, the second stop condition may be met provided that the serving end divides the image area once. When R2 is arranged in a third place in the length value set, the serving end needs to divide the image area three times to meet the second stop condition.

To reduce the calculation amount of the serving end, when the second stop condition is the condition that a percentage of hit image blocks in an image block subset obtained by dividing the image area by the serving end based on a length value in the length value set is greater than or equal to the target sub-threshold, a priority order of the plurality of length values in the length value set may be determined based on historical hit ratios. Optionally, a length value having a relatively high historical hit ratio has a relatively high priority. A hit ratio of a length value is a percentage of hit image blocks in an image block subset obtained by dividing the image area based on the length value. In addition, a priority order of the plurality of block segmentation solutions in the block segmentation solution set corresponds to the priority order in the length value set. In other words, a priority order of a block segmentation solution in the block segmentation solution set is consistent with a priority order of a length value that is correspondingly used for the block segmentation solution and that is in the length value set. When dividing the image area according to the block segmentation solutions included in the block segmentation solution set, the serving end may divide the image area in descending order of priorities of the block segmentation solutions in the block segmentation solution set. In other words, the serving end may divide the image area in descending order of priorities of the length values in the length value set.

The length values in the length value set may be sequentially arranged based on the historical hit ratios, and the order in which the length values are arranged reflects the priorities of the length values. A hit ratio of a length value is a percentage of hit image blocks in an image block subset obtained by dividing the image area based on the length value.

Table 1 is an arrangement table of an example of a length value set according to this embodiment of this application. It can be learned from Table 1 that, in a historical desktop image, a quantity of times a length value 21 is used as a target length value is 4220. In other words, a quantity of times an image block subset obtained by dividing an image area of the historical desktop image by the serving end by using the length value 21 is the target image block subset is 4220. A hit ratio is 0.128001, and the hit ratio is highest. Therefore, the length value 21 is arranged in a first place in the length value set.

TABLE 1

| Length value | Quantity of times | Hit ratio |
| --- | --- | --- |
| 21 | 4220 | 0.128011 |
| 62 | 2594 | 0.078687 |
| 64 | 2566 | 0.077838 |
| 40 | 1894 | 0.057453 |
| 5 | 1803 | 0.054693 |
| 6 | 1726 | 0.052357 |
| ... | ... | ... |

The length values in the length value set are arranged in descending order of the hit ratios. Therefore, when the target sub-condition is the condition that a percentage of hit image blocks in an image block subset obtained by dividing the image area by the serving end based on a length value in the length value set is greater than or equal to the target sub-threshold, a quantity of times the serving end divides the image area can be reduced, and the calculation amount of the serving end can be reduced.

For an image area in a to-be-sent desktop image, after determining a target image block subset of the image area, the serving end may determine a length value used to obtain the target image block subset through division, and then the serving end may add 1 to a value of a quantity of times that corresponds to the length value and that is in the arrangement table of the length value set, and correspondingly update a hit ratio of the length value, to maintain the arrangement table of the length value set.

In a possible implementation, there is a relatively high possibility that target length values of adjacent image areas are the same. Therefore, to further reduce the quantity of times the serving end segments the image area and reduce the calculation amount of the serving end, when an image area that needs to be divided is not a first image area to be divided, the serving end may determine a target length value (which is referred to as a second length value below) of a previous image area of the image area. A previous image area of an image area is an image area that is adjacent to the image area along the first direction in the desktop image and that has been divided into image blocks. Then the serving end may first divide the image area by using the second length value. When a percentage of hit image blocks in an alternative image block subset obtained by dividing the image area by using the second length value is less than the target sub-threshold, in other words, when the second stop condition is not met after the image area is divided by using the second length value, the serving end may divide the image area by sequentially using the plurality of block segmentation solutions in the block segmentation solution set, until the target image block subset is obtained. Optionally, the serving end may divide the image area in descending order of priorities of the block segmentation solutions in the block segmentation solution set, until the target image block subset is obtained. When a percentage of hit image blocks in an image block subset obtained by dividing the image area by using the second length value is greater than or equal to the target sub-threshold, in other words, when the second stop condition is met after the image area is divided by using the second length value, the serving end may stop continuing dividing the image area, and may determine, as the target image block subset, the alternative image block subset obtained by dividing the image area by using the second length value, and determine, as the target block segmentation solution, a block segmentation solution corresponding to the second length value.

When an image area that needs to be divided is a first image area to be divided, the serving end may divide the image area by sequentially using the plurality of block segmentation solutions in the block segmentation solution set, until the target image block subset is obtained. Optionally, the serving end may divide the image area in descending order of priorities of the block segmentation solutions in the block segmentation solution set, until the target image block subset is obtained.

D2. The serving end uses the target image block subset of each image area to form the image block set.

2. A technical process in which the serving end divides the desktop image according to the static location segmentation solution to obtain an image block set may include step A3, step B3, step C3, and step D3.

A3. The serving end determines an instruction origin of the desktop image.

Step A3 is similar to step A2, and details are not described herein again in this embodiment of this application.

B3. The serving end divides the desktop image into a plurality of image areas along the first direction in an area division manner included in the static location segmentation solution.

Optionally, the area division manner included in the static location segmentation solution is: segmenting the desktop image into the plurality of image areas by using the instruction origin of the desktop image as a segmentation starting point. Each image area is a rectangular area, and the plurality of image areas are sequentially arranged along the first direction. A first image area in the plurality of image areas includes two boundaries that are respectively a first boundary and a second boundary. The two boundaries are both parallel to the second direction (in other words, perpendicular to the first direction). The first boundary passes the instruction origin of the desktop image, a coordinate value (which is briefly referred to as a coordinate value below) of the second boundary in the first direction in a screen coordinate system of the user end falls within a coordinate value range of the desktop image in the first direction in the screen coordinate system of the user end, and the coordinate value of the second boundary is an integer multiple of the first preset segmentation length L. In addition, a distance between the first boundary and the second boundary is less than or equal to the first preset segmentation length L. A length k3, in the first direction, of each of the plurality of image areas except the first image area and a last image area is equal to the first preset segmentation length L, a length k5, in the first direction, of the last image area in the plurality of image areas meets a third formula, and the third formula is $y2 \times k3 + k4 + k5 = N$, where $y2 = \lceil (N-k4)/k3 \rceil - 1$, N is a total length of the desktop image in the first direction, $\lceil \lceil$ indicates rounding up, k4 is a length of the first image area in the first direction, and k4 is equal to the distance between the first boundary and the second boundary of the first image area.

It should be noted that the first image area is an image area that is closest to the instruction origin of the desktop image in the first direction and that is in the plurality of image areas obtained by segmenting the desktop image.

It can be learned from the foregoing descriptions that the coordinate value of the second boundary of the first image area is an integer multiple of the first preset segmentation length L, and lengths, in the first direction, of other image areas in the plurality of image areas except the first image area and the last image area are all equal to the first preset segmentation length. Therefore, coordinate values, in the first direction in the screen coordinate system of the user end, of two boundaries that are parallel to the second direction and that are in each of the other image areas are both an integer multiple of the first preset segmentation length L.

In addition, it can be learned from the third formula that, when a difference between the total length N of the desktop image in the first direction and the length k4 of the first image area in the first direction is an integer multiple of the first preset segmentation length L, the length k5 of the last image area in the first direction is equal to the first preset segmentation length L. When a difference between the total length N of the desktop image in the first direction and the length k4 of the first image area in the first direction is not an integer multiple of the first preset segmentation length L, the length k5 of the last image area in the first direction is equal to a remainder obtained by dividing the difference between the total length N of the desktop image in the first direction and the length k4 of the first image area in the first direction by the first preset segmentation length L.

Figure 2H:
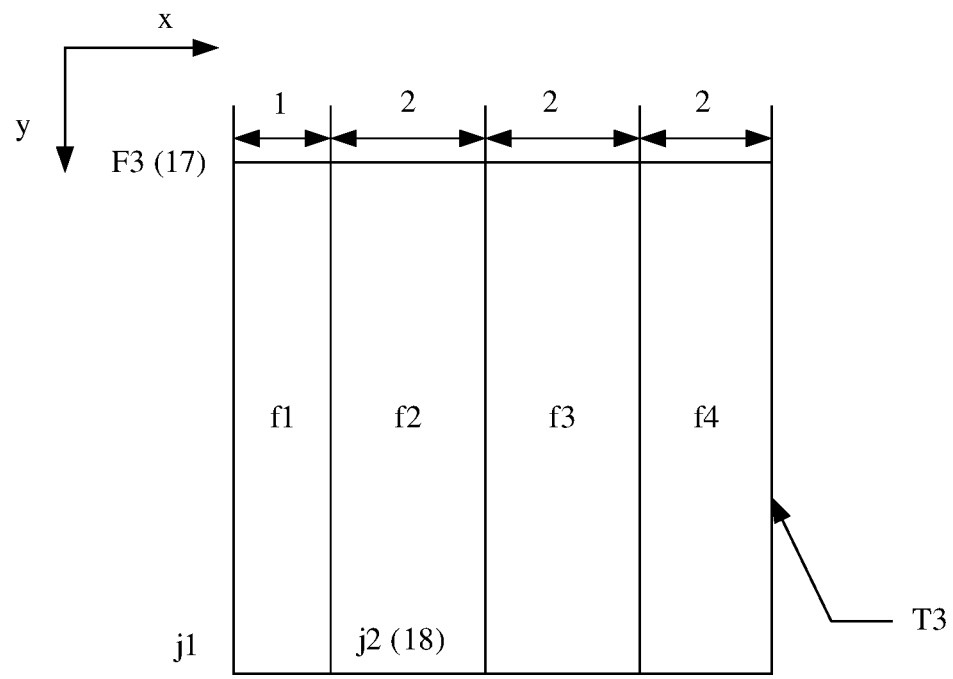
FIG. 2H is a schematic diagram of segmenting an image area according to an embodiment of this application.

For example, as shown in FIG. 2H, a coordinate value of an instruction origin F3 of a desktop image T3 in the first direction (namely, a row direction x) of the screen coordinate system of the user end is 17, the first preset segmentation length L is equal to 2, and a length of the desktop image T3 in the first direction is 7. It can be learned from the foregoing descriptions that a first boundary j1 of a first image area f1 in a plurality of image areas obtained by segmenting the desktop image T3 is parallel to the second direction (namely, a column direction y), and passes the instruction origin F3. A second boundary j2 of the first image area f1 is parallel to the second direction, and a coordinate value of the second boundary j2 in the first direction in the screen coordinate system of the user end falls within a coordinate value range of the desktop image T3 in the first direction in the screen coordinate system of the user end. The coordinate value of the second boundary j2 in the first direction in the screen coordinate system of the user end is an integer multiple of the first preset segmentation length L. In addition, a distance between the first boundary j1 and the second boundary j2 is less than or equal to the first preset segmentation length L. Therefore, the coordinate value of the second boundary j2 in the first direction in the screen coordinate system of the user end is 18. In other words, a length of the first image area f1 in the first direction is 1. According to the third formula, $y2=\lceil(7-1)/2\rceil-1=2$, $2 \times 2+1+k5=7$, and $k5=2$. The serving end may segment, by using the instruction origin F3 of the desktop image T3 as a segmentation starting point, the desktop image T3 into four image areas f1, f2, f3, and f4 that are sequentially arranged along the first direction. The length of the first image area f1 in the first direction is equal to 1, lengths of the two intermediate image areas f2 and f3 in the first direction are equal to 2, and a length of the last image area f4 in the first direction is equal to 2.

When the desktop image relatively significantly changes (for example, the desktop image significantly changes when the user end initially establishes a connection to the virtual machine deployed on the serving end), the serving end usually sends an entire image to the user end. A size of the entire image is the same as the size of the user end screen. In other words, an instruction origin of the entire image coincides with an upper left corner of the user end screen. When sending the entire image, the serving end may segment the entire image based on a fixed step (the first preset length L) by using the instruction origin (the upper left corner of the user end screen) as a segmentation starting point, to obtain a plurality of image areas. Therefore, coordinate values, in the first direction in the screen coordinate system of the user end, of two boundaries that are parallel to the second direction and that are in each of the plurality of image areas obtained by segmenting the entire image are both an integer multiple of the first preset segmentation length L.

In the static location segmentation solution, the coordinate value, in the first direction in the screen coordinate system of the user end, of the second boundary of the first image area obtained by segmenting the desktop image by the serving end is an integer multiple of the first preset segmentation length L. After obtaining the first image area through segmentation, the serving end may segment another area of the desktop image based on a fixed step to obtain other image areas different from the first image area and the last image area. Because the fixed step is the first preset segmentation length, coordinate values, in the first direction in the screen coordinate system of the user end, of two boundaries that are parallel to the second direction and that are in each of the other image areas are both an integer multiple of the first preset segmentation length L.

In this way, the other image areas that are different from the first image area and the last image area and that are obtained by segmenting the desktop image according to the static location segmentation solution coincide with the image areas obtained by segmenting the entire desktop image. In a subsequent step, there is accordingly a relatively high percentage of hit image blocks in an image block set obtained by segmenting the other image areas. In this way, bandwidth between the serving end and the user end can be reduced.

C3. The serving end determines a target image block subset for each of the plurality of image areas obtained by dividing the desktop image.

D3. The serving end uses the target image block subset of each image area to form the image block set.

It should be noted that a technical process of step C3 is similar to the technical process of step C2, and a technical process of step D3 is similar to the technical process of step D2. Therefore, details are not described herein again in this embodiment of this application.

3. A technical process in which the serving end divides the desktop image according to the motion prediction segmentation solution to obtain an image block set may include step A4, step B4, step C4, step D4, step E4, and step F4.

A4. The serving end determines an instruction origin of the desktop image.

Step A4 is similar to step A2, and details are not described herein again in this embodiment of this application.

B4. The serving end determines a preset area in the desktop image.

An instruction origin of the preset area coincides with the instruction origin of the desktop image, a length of the preset area in the first direction is equal to an integer multiple of the first preset segmentation length L, and a length of the preset area in the second direction is equal to an integer multiple of a second preset segmentation length L'. During actual implementation, the length of the preset area in the first direction may be twice the first preset segmentation length L, and the length of the preset area in the second direction may be twice the second preset segmentation length L'.

Figure 2I:
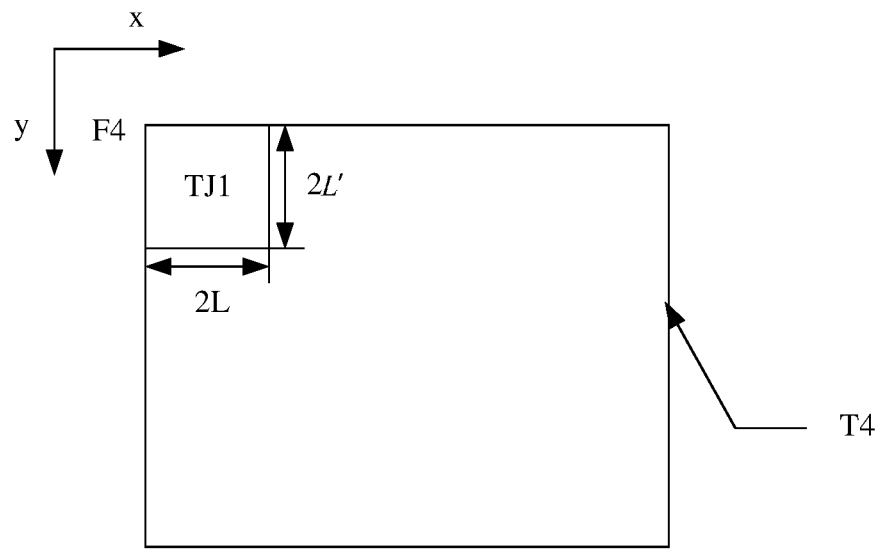
FIG. 2I is a schematic diagram of a preset area according to an embodiment of this application.

As shown in FIG. 2I, T4 is a desktop image, and TJ1 is a preset area. An instruction origin of the preset area TJ1 coincides with an instruction origin of the desktop image T4, and the instruction origins are both F4. A length of the preset area TJ1 in the first direction (namely, a row direction x) is equal to 2 L, in other words, is twice the first preset segmentation length L. A length of the preset area TJ1 in the second direction (namely, a column direction y) is equal to 2, in other words, is twice the second preset segmentation length L'.

It should be noted that when a size of the desktop image is relatively small, and consequently the serving end cannot determine the preset area in the desktop image, the serving end may stop dividing the desktop image according to the motion prediction segmentation solution.

C4. The serving end determines a target instruction origin in the preset area.

The target instruction origin is an instruction origin of a target image block, the target image block is a hit image block, a length of the target image block in the first direction is equal to the first preset segmentation length L, and a length of the target image block in the second direction is equal to the second preset segmentation length L'.

In addition, the target instruction origin needs to meet the following two conditions. Condition 1: A distance L1, in the first direction, between the target instruction origin and the instruction origin of the desktop image meets $0<L1<L$, and a distance L2, in the second direction, between the target instruction origin and the instruction origin of the desktop image meets $0 \leq L2<L'$, where L is the first preset segmentation length, and L' is the second preset segmentation length. Condition 2: A coordinate value of the target instruction origin in the first direction in the screen coordinate system of the user end is not equal to an integer multiple of the first preset segmentation length.

Because the target instruction origin needs to meet the foregoing two conditions, for the desktop image, a first image area obtained through segmentation according to the motion prediction segmentation solution is not the same as the first image area obtained through segmentation according to each of the static location segmentation solution and the instruction origin segmentation solution. This can avoid a problem of serving-end repetitive calculation caused by a case in which a plurality of image areas obtained through segmentation according to the motion prediction segmentation solution are consistent with the plurality of image areas obtained through segmentation according to the instruction origin segmentation solution or the static location segmentation solution.

D4. The serving end divides the desktop image into a plurality of image areas along the first direction in an area division manner included in the motion prediction segmentation solution.

Optionally, the area division manner included in the motion prediction segmentation solution is: dividing the desktop image into the plurality of image areas by using the instruction origin of the desktop image as a segmentation starting point. Each image area is a rectangular area, and the plurality of image areas are sequentially arranged along the first direction. A length k7, in the first direction, of the first image area in the plurality of image areas is equal to a distance L1, in the first direction, between the target instruction origin and the instruction origin of the desktop image; a length k6, in the first direction, of each of the plurality of image areas except the first image area and a last image area is equal to the first preset segmentation length L; a length k8 of the last image area in the first direction meets a fourth formula; and the fourth formula is $y3 \times k6+k7+k8=N$, where $y3=\lceil(N-k7)/k6\rceil-1$, N is a total length of the desktop image in the first direction, and $\lceil \ \rceil$ indicates rounding up.

It can be learned from the fourth formula that, when a difference between the total length N of the desktop image in the first direction and the length k7 of the first image area in the first direction is an integer multiple of the first preset segmentation length L, the length k8 of the last image area in the first direction is equal to the first preset segmentation length L. When a difference between the total length N of the desktop image in the first direction and the length k7 of the first image area in the first direction is not an integer multiple of the first preset segmentation length L, the length k8 of the last image area in the first direction is equal to a remainder obtained by dividing the difference between the total length N of the desktop image in the first direction and the length k7 of the first image area in the first direction by the first preset segmentation length L.

Figure 2J:
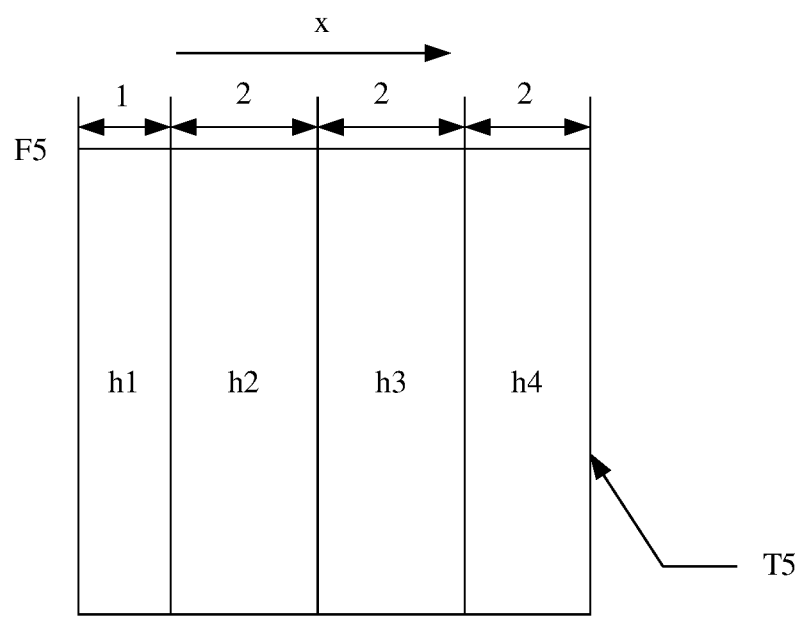
FIG. 2J is a schematic diagram of segmenting an image area according to an embodiment of this application.

For example, as shown in FIG. 2J, a length of a desktop image T5 in the first direction (namely, a row direction) is 7, the first preset segmentation length L is equal to 2, and a distance L1, in the first direction, between the target instruction origin MD and an instruction origin F5 of the desktop image T5 is 1. According to the fourth formula, $y3=\lceil(7-1)/2\rceil-1=2$, $2\times2+1+k8=7$, and $k8=2$. The serving end may segment, by using the instruction origin F5 of the desktop image T5 as a segmentation starting point, the desktop image T5 into four image areas h1, h2, h3, and h4 that are sequentially arranged along the first direction. A length of the first image area h1 in the first direction is equal to 1, lengths of the two intermediate image areas h2 and h3 in the first direction are both equal to 2, and a length of the last image area h4 in the first direction is equal to 2.

When an instruction origin of a to-be-sent desktop image changes compared with an instruction origin of a sent desktop image, in the motion prediction segmentation solution, a possible location of the instruction origin of the sent desktop image in the first direction may be searched for. Then the serving end may segment the desktop image based on a fixed step (namely, the first preset segmentation length) by using the possible location as a segmentation starting point. In this way, there is a relatively high possibility that a plurality of image areas obtained by segmenting the to-be-sent desktop image coincide with a plurality of image areas obtained by segmenting the sent desktop image, and in a subsequent step, there is accordingly a relatively high percentage of hit image blocks in an image block set obtained by segmenting the plurality of image areas of the to-be-sent desktop image. In this way, bandwidth between the serving end and the user end can be reduced.

It can be learned from the foregoing descriptions that, because the target image block is the hit image block, and a distance between the instruction origin (namely, the target instruction origin) of the target image block and the instruction origin of the to-be-sent desktop image is relatively small, the target image block is likely to be a first image block in a first image area obtained by segmenting the sent desktop image. In other words, the target instruction origin is likely to coincide with the instruction origin of the sent desktop image. Therefore, in the foregoing step, searching for the target instruction origin by the serving end is essentially searching for the possible location of the instruction origin of the sent desktop image in the first direction.

E4. The serving end determines a target image block subset for each of the plurality of image areas obtained by dividing the desktop image.

F4. The serving end uses the target image block subset of each image area to form the image block set.

It should be noted that a technical process of step E4 is similar to the technical process of step C2, and a technical process of step F4 is similar to the technical process of step D2. Therefore, details are not described herein again in this embodiment of this application.

Step 203: The serving end sends data information of each image block and location information of each image block in the target image block set to a user end.

Data information of a hit image block in the target image block set includes a flag value of the hit image block, data information of a missed image block includes image data of the missed image block, and the image data of the missed image block may be pixel values of the missed image block. The data information of the missed image block may be encoded pixel values of the missed image block. A location of an image block in the desktop image is recorded in location information of the image block.

To sum up, according to the image sending method provided in this embodiment of this application, the serving end divides the desktop image according to the image segmentation solution included in the image segmentation solution set, to obtain the target image block set meeting the target condition. Then the serving end sends the data information of each image block and the location information of each image block in the target image block set to the user end. The target condition includes: the percentage of the hit image blocks in the target image block set is greater than or equal to the target threshold, or the percentage of the hit image blocks in the target image block set is greater than the percentage of the hit image blocks in the another image block set. Therefore, it can be ensured that the percentage of the hit image blocks in the target image block set obtained by dividing the desktop image by the serving end is relatively high. The data information of the hit image block is the flag value of the hit image block, the data information of the missed image block is the image data of the missed image block, the image data may be the pixel values of the missed image block, and a data volume of the flag value is usually less than a data volume of the image data. Therefore, compared with the missed image block, smaller bandwidth is required by the serving end for sending the data information of the hit image block to the user end. Accordingly, the relatively high percentage of the hit image blocks in the target image block set obtained by dividing the desktop image by the serving end may help reduce the bandwidth between the serving end and the user end.

Apparatus embodiments of this application are as follows, and may be used to perform the method embodiments of this application. For details that are not disclosed in the apparatus embodiments of this application, refer to the method embodiments of this application.

Figure 3:
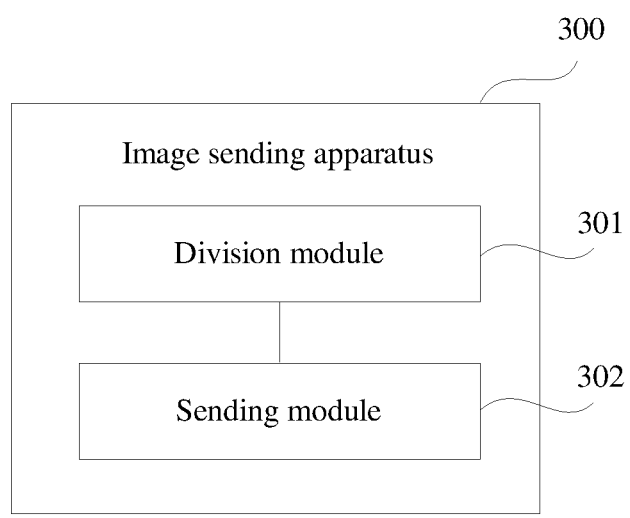
FIG. 3 is a block diagram of an image sending apparatus according to an embodiment of this application.

FIG. 3 is a block diagram of an image sending apparatus 300 according to an embodiment of this application. Referring to FIG. 3, the image sending apparatus 300 may include a division module 301 and a sending module 302.

The division module 301 is configured to divide a desktop image according to an image segmentation solution included in an image segmentation solution set, to obtain a target image block set, where the target image block set includes a plurality of image blocks, and each of the plurality of image blocks is a hit image block or a missed image block; in addition, the target image block set meets a target condition, and the target condition includes: a percentage of hit image blocks in the target image block set is greater than or equal to a target threshold, or a percentage of hit image blocks in the target image block set is greater than a percentage of hit image blocks in another image block set; and the another image block set is obtained by dividing the desktop image according to another image segmentation solution included in the image segmentation solution set.

The sending module 302 is configured to send data information of each image block and location information of each image block in the target image block set to a user end, where data information of the hit image block includes a flag value of the hit image block, data information of the missed image block includes image data of the missed image block, and a location of each image block in the desktop image is recorded in the location information of the image block.

In an embodiment of this application, the division module 301 is configured to: separately divide the desktop image by sequentially using a plurality of image segmentation solutions in the image segmentation solution set, until a percentage of a quantity of hit image blocks in an image block set obtained through division in a quantity of all image blocks in the image block set obtained through division is greater than or equal to the target threshold; and use, as the target image block set, the image block set obtained through division.

In an embodiment of this application, the division module 301 is configured to: separately divide the desktop image according to each image segmentation solution in the image segmentation solution set, to obtain an image block set corresponding to each image segmentation solution; for each image block set, calculate a percentage of a quantity of hit image blocks in the image block set in a quantity of all image blocks in the image block set; and select, as the target image block set, an image block set with a highest percentage from a plurality of image block sets corresponding to all image segmentation solutions in the image segmentation solution set.

In an embodiment of this application, the plurality of image segmentation solutions in the image segmentation solution set include different area division manners, and the division module 301 is configured to: divide the desktop image into a plurality of image areas along a first direction in an area division manner of the image segmentation solution; and divide each of the plurality of image areas into at least one image block.

In an embodiment of this application, the division module 301 is configured to: determine an instruction origin of the desktop image, where the instruction origin of the desktop image is a vertex of a bounding rectangle of the desktop image, and the first direction is parallel to a side of the bounding rectangle; and segment, by using the instruction origin of the desktop image as a segmentation starting point, the desktop image into the plurality of image areas that are sequentially arranged along the first direction, where a length k1, in the first direction, of each of the plurality of image areas except a last image area is equal to a first preset segmentation length, and a length k2 of the last image area in the first direction meets: $k2=N-y1\times k1$ and $y1=\lceil N/k1 \rceil -1$, where N is a total length of the desktop image in the first direction, and $\lceil\ \rceil$ indicates rounding up.

In an embodiment of this application, the division module 301 is configured to segment, by using an instruction origin of the desktop image as a segmentation starting point, the desktop image into the plurality of image areas that are sequentially arranged along the first direction, where the instruction origin of the desktop image is a vertex of a bounding rectangle of the desktop image, and the first direction is parallel to a side of the bounding rectangle. A length k3, in the first direction, of each of the plurality of image areas except a first image area and a last image area is equal to a first preset segmentation length L, a first boundary of the first image area passes the instruction origin of the desktop image, a coordinate value of a second boundary of the first image area in the first direction in a screen coordinate system falls within a coordinate range of the desktop image in the first direction in the screen coordinate system, and is an integer multiple of the first preset segmentation length, both the first boundary and the second boundary are perpendicular to the first direction, a distance between the first boundary and the second boundary is less than or equal to the first preset segmentation length, and a length k4 of the first image area in the first direction and a length k5 of the last image area in the first direction meet $y2\times k3+k4+k5=N$, where $y2=\lceil (N-k4)/k3 \rceil -1$, N is a total length of the desktop image in the first direction, $\lceil\ \rceil$ indicates rounding up, and k4 is equal to the distance between the first boundary and the second boundary.

In an embodiment of this application, the division module 301 is configured to: determine a target image block in a preset area of the desktop image, where the target image block is a hit image block, a length of the target image block in the first direction is equal to a first preset segmentation length L, a length of the target image block in a second direction is equal to a second preset segmentation length L', the first direction is perpendicular to the second direction, and an instruction origin of the preset area is the same as an instruction origin of the desktop image; and segment, by using the instruction origin of the desktop image as a segmentation starting point, the desktop image into the plurality of image areas that are sequentially arranged along the first direction, where a length k6, in the first direction, of each of the plurality of image areas except a first image area and a last image area is equal to the first preset segmentation length L, and a length k7 of the first image area in the first direction and a length k8 of the last image area in the first direction meet $y3\times k6+k7+k8=N$, where $y3=\lceil (N-k7)/k6 \rceil -1$, N is a total length of the desktop image in the first direction, ⌈ ⌉ indicates rounding up, and k7 is equal to a distance, in the first direction, between an instruction origin of the target image block and the instruction origin of the desktop image.

In an embodiment of this application, the distance L1, in the first direction, between the instruction origin of the target image block and the instruction origin of the desktop image meets the inequality 0<L1<L, and a distance L2, in the second direction, between the instruction origin of the target image block and the instruction origin of the desktop image meets the inequality 0≤L2<L'.

In an embodiment of this application, the division module 301 is configured to separately divide the image area sequentially according to block segmentation solutions included in a block segmentation solution set, to obtain a target image block subset, where the target image block subset includes a plurality of image blocks; the target image block subset meets a target sub-condition; the target sub-condition includes: a percentage of hit image blocks in the target image block subset is greater than or equal to a target sub-threshold, or a percentage of hit image blocks in the target image block subset is greater than a percentage of hit image blocks in another image block subset; and the another image block subset is obtained by dividing the image area according to another block segmentation solution included in the block segmentation solution set.

In an embodiment of this application, the division module 301 is configured to: determine, from a length value set, a first length value R1 corresponding to the block segmentation solution, where the length value set includes a plurality of length values, each length value included in the length value set is less than or equal to the second preset segmentation length L', and different length values in the length value set are used in different block segmentation solutions in the block segmentation solution set; and segment the image area into the plurality of image blocks that are sequentially arranged along the second direction, where a length p1, in the second direction, of each of the plurality of image blocks except a first image block and a last image block is equal to the second preset segmentation length L', and a length p2 of the first image block in the second direction and a length p3 of the last image block in the second direction meet z×p1+p2+p3=M, where z=⌈(M−p2)/p1⌉−1, M is a total length of the desktop image in the second direction, ⌈ ⌉ indicates rounding up, p2 is equal to the first length value R1, and the second direction is perpendicular to the first direction.

In an embodiment of this application, a priority order of the plurality of length values in the length value set is determined based on historical hit ratios, and the hit ratios are percentages of hit image blocks in image block subsets obtained by dividing the image area based on the length values; and a priority order of a plurality of block segmentation solutions in the block segmentation solution set corresponds to the priority order in the length value set.

In an embodiment of this application, the division module 301 is configured to: obtain a second length value, where the second length value is a length value used in a target block segmentation solution used to divide a previous image area of the image area, and the previous image area is an image area that is adjacent to the image area along the first direction in the desktop image and that has been divided into image blocks; divide the image area by using the block segmentation solution corresponding to the second length value, to obtain an alternative image block subset; use the alternative image block subset as the target image block subset when a percentage of hit image blocks in the alternative image block subset is greater than or equal to the target sub-threshold; and when a percentage of hit image blocks in the alternative image block subset is less than the target sub-threshold, divide the image area by sequentially using the plurality of block segmentation solutions in the block segmentation solution set, to obtain the target image block subset.

To sum up, according to the image sending apparatus provided in this embodiment of this application, the serving end divides the desktop image according to the image segmentation solution included in the image segmentation solution set, to obtain the target image block set meeting the target condition. Then the serving end sends the data information of each image block and the location information of each image block in the target image block set to the user end. The target condition includes: the percentage of the hit image blocks in the target image block set is greater than or equal to the target threshold, or the percentage of the hit image blocks in the target image block set is greater than the percentage of the hit image blocks in the another image block set. Therefore, it can be ensured that the percentage of the hit image blocks in the target image block set obtained by dividing the desktop image by the serving end is relatively high. The data information of the hit image block is the flag value of the hit image block, the data information of the missed image block is the image data of the missed image block, the image data may be pixel values of the missed image block, and a data volume of the flag value is usually less than a data volume of the image data. Therefore, compared with the missed image block, smaller bandwidth is required by the serving end for sending the data information of the hit image block to the user end. Accordingly, the relatively high percentage of the hit image blocks in the target image block set obtained by dividing the desktop image by the serving end may help reduce the bandwidth between the serving end and the user end.

An embodiment of this application provides an image sending apparatus 400. The image sending apparatus 400 may be a serving end in a VDI architecture. A virtual machine may be deployed on the image sending apparatus 400. Optionally, the image sending apparatus 400 may be a server, or may be another computing device on which a virtual machine can be deployed. The image sending apparatus 400 may be configured to perform the image sending method provided in the foregoing method embodiment.

Figure 4:
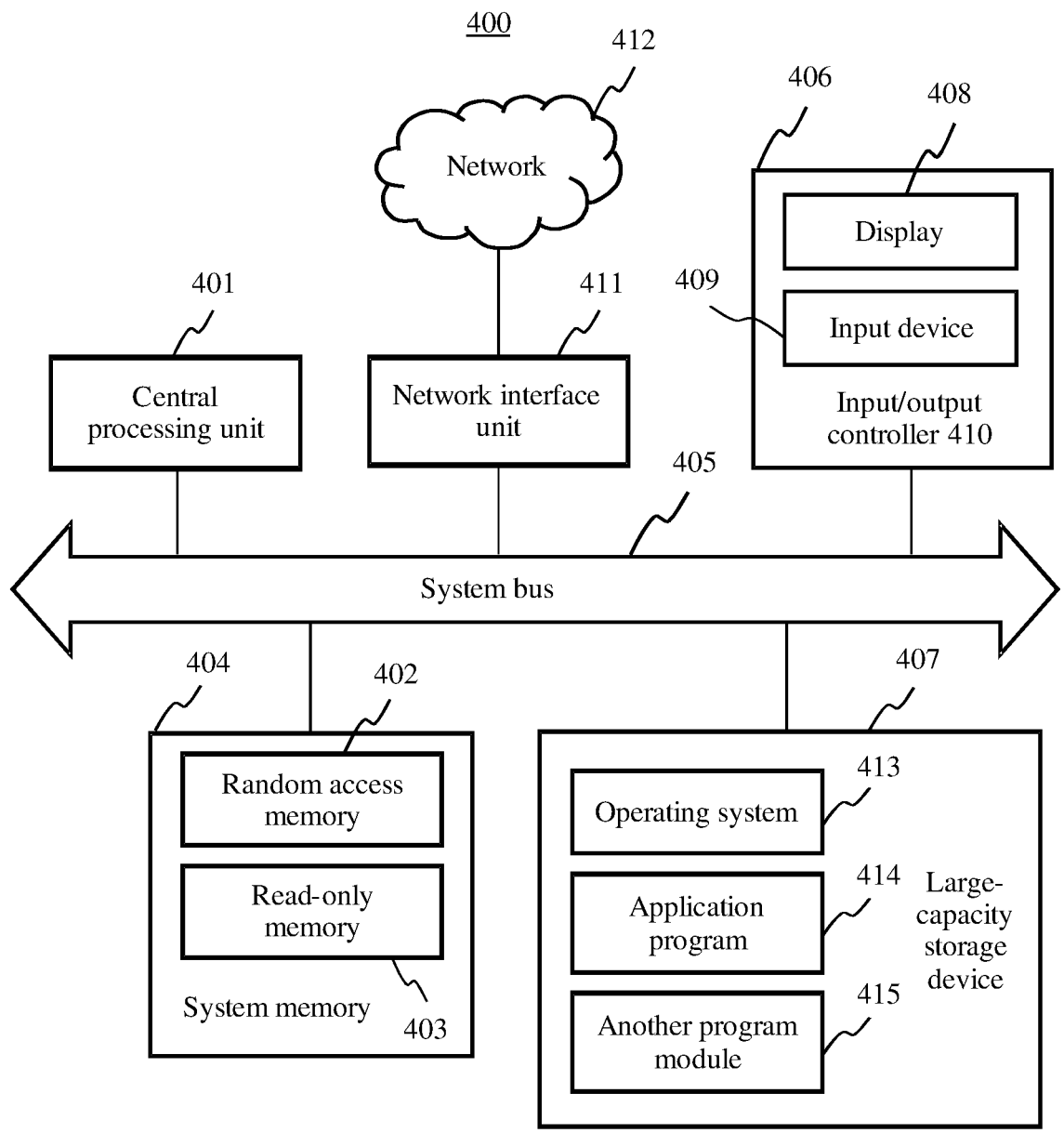
FIG. 4 is a block diagram of an image sending apparatus according to an embodiment of this application.

Referring to FIG. 4, the image sending apparatus 400 includes a processor, for example, a central processing unit (CPU) 401. The processor included in the image sending apparatus 400 may be configured to implement a function of the division module 301 in the foregoing embodiment. The image sending apparatus 400 includes a memory, for example, a system memory 404 including a random-access memory (RAM) 402 and a read-only memory (ROM) 403. The image sending apparatus 400 includes a system bus 405 connecting the system memory 404 and the central processing unit 401. The image sending apparatus 400 further includes a basic input/output I/O) system 406 that helps components in a computer to transmit information, and a large-capacity storage device 407 configured to store an operating system 413, an application program 414, and another program module 415.

The basic input/output system 406 includes a display 408 configured to display information and an input device 409, such as a mouse or a keyboard, used by a user to enter information. The display 408 and the input device 409 are connected to the central processing unit 401 by using an input/output controller 410 connected to the system bus 405. The basic input/output system 406 may further include the input/output controller 410, to receive and process input from a plurality of other devices, such as a keyboard, a mouse, or an electronic stylus. Similarly, the input/output controller 410 further provides output to a display screen, a printer, or another type of output device.

The large-capacity storage device 407 is connected to the central processing unit 401 by using a large-capacity storage controller (not shown) connected to the system bus 405. The large-capacity storage device 407 and a computer readable medium associated with the large-capacity storage device 407 provide non-volatile storage for the image sending apparatus 400. In other words, the large-capacity storage device 407 may include a computer readable medium (not shown), such as a hard disk or a CD-ROM drive.

Generally, the computer readable medium may include a computer storage medium and a communications medium. The computer storage medium includes a volatile medium, a non-volatile medium, a movable medium, or an unmovable medium implemented by using any method or technology used to store information such as a computer readable instruction, a data structure, a program module, or other data. The computer storage medium includes a RAM, a ROM, an EPROM, an EEPROM, a flash memory or another solid-state storage technology, a CD-ROM, a DVD or another optical storage, a cassette, a magnetic tape, or a disk storage or another magnetic storage device. Certainly, a person skilled in the art may learn that the computer storage medium is not limited to the foregoing several types. The system memory 404 and the large-capacity storage device 407 may be collectively referred to as a memory.

According to this embodiment of this application, the image sending apparatus 400 may be further connected to a remote computer on a network through a network such as the Internet for running. To be specific, the image sending apparatus 400 may be connected to a network 412 by using a network interface unit 411 connected to the system bus 405, or may be connected to another type of network or a remote computer system (not shown) by using the network interface unit 411. The network interface unit 411 included in the image sending apparatus 400 may be configured to implement a function of the sending module 302 in the foregoing embodiment.

The memory further includes one or more programs. The one or more programs are stored in the memory. The central processing unit 401 executes the one or more programs to implement the image sending method provided in the foregoing embodiment.

An embodiment of this application further provides a non-transitory computer readable storage medium including an instruction, for example, a memory including an instruction, and the foregoing instruction may be executed by a processor to implement the image sending method in the method embodiment of this application. For example, the non-transitory computer readable storage medium may be a ROM, a RAM, a CD-ROM, a magnetic tape, a floppy disk, or an optical data storage device.

An embodiment of this application further provides a computer program product including an instruction. When the computer program product is run on a computer, the computer is enabled to perform the image sending method in the method embodiment of this application.

A person of ordinary skill in the art may understand that all or some of the steps of the embodiments may be implemented by hardware or a program instructing related hardware. The program may be stored in a computer readable storage medium. The storage medium mentioned above may be a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A method comprising:
   dividing a desktop image according to a first image segmentation solution in an image segmentation solution set to obtain a first image block set, wherein the first image block set comprises first image blocks, and wherein each of the first image blocks is a first hit image block or a first missed image block;
   dividing a copy of the desktop image according to a second image segmentation solution in the image segmentation solution set to obtain a second image block set, wherein the second image block set comprises second image blocks, wherein each of the second image blocks is a second hit image block or a second missed image block, wherein the first image block set meets a first target condition or a second target condition, wherein the first target condition is that a first percentage of the first hit image blocks in the first image block set is greater than or equal to a target threshold, wherein the second target condition is that the first percentage is greater than a second percentage of the second hit image blocks in the second image block set; and
   sending data information and location information of each first image block to a user end,
   wherein the data information of the first hit image blocks comprises flag values indicating previous sending of the first hit image blocks,
   wherein the data information of the first missed image blocks comprises image data of the first missed image blocks, and
   wherein the location information comprises a location of each first image block.

2. The method of claim 1, wherein the first image segmentation solution comprises a plurality of third image segmentation solutions, and wherein the method further comprises dividing the desktop image according to the third image segmentation solutions until a percentage of the first hit image blocks is greater than or equal to the target threshold.

3. The method of claim 1, further comprising:
   determining, from between the first percentage and the second percentage, a higher percentage; and
   selecting, from between the first image block set and the second image block set, a target image block set corresponding to the higher percentage.

4. The method of claim 1, wherein the first image segmentation solution comprises an area division manner, and wherein the method further comprises:
   dividing the desktop image into image areas along a first direction according to the area division manner; and
   dividing each of the image areas into at least one of the first image blocks.

5. The method of claim 4, further comprising:
   determining an instruction origin of the desktop image, wherein the instruction origin is a vertex of a bounding rectangle of the desktop image, and wherein the first direction is parallel to a side of the bounding rectangle; and segmenting, using the instruction origin as a segmentation starting point, the desktop image into the image areas that are sequentially arranged along the first direction, wherein a length k1 in the first direction of each of the image areas except a last image area is equal to a first preset segmentation length, wherein a length k2 of the last image area meets $k2=N-y1 \times k1$ and $y1=\lceil N/k1 \rceil -1$, wherein N is a total length of the desktop image in the first direction, and wherein $\lceil \ \rceil$ indicates rounding up.

6. The method of claim 4, further comprising segmenting, using an instruction origin of the desktop image as a segmentation starting point, the desktop image into the image areas that are sequentially arranged along the first direction, wherein the instruction origin is a vertex of a bounding rectangle of the desktop image, and wherein the first direction is parallel to a side of the bounding rectangle, wherein a length k3 in the first direction of each of the image areas except a first image area and a last image area is equal to a first preset segmentation length L, wherein a first boundary of the first image area passes the instruction origin, wherein a coordinate value of a second boundary of the first image area in the first direction in a screen coordinate system falls within a coordinate range of the desktop image in the first direction in the screen coordinate system and is an integer multiple of L, wherein the first boundary and the second boundary are perpendicular to the first direction, wherein a distance between the first boundary and the second boundary is less than or equal to L, wherein a length k4 of the first image area in the first direction and a length k5 of the last image area in the first direction meet $y2 \times k3+k4+k5=N$, wherein $y2=\lceil (N-k4)/k3 \rceil -1$, wherein N is a total length of the desktop image in the first direction, wherein $\lceil \ \rceil$ indicates rounding up, and wherein k4 is equal to the distance between the first boundary and the second boundary.

7. The method of claim 4, further comprising:
determining a target image block in a preset area of the desktop image, wherein the target image block is one of the first hit image blocks, wherein a length of the target image block in the first direction is equal to a first preset segmentation length L, wherein a length of the target image block in a second direction is equal to a second preset segmentation length L', wherein the first direction is perpendicular to the second direction, wherein an instruction origin of the preset area is the same as an instruction origin of the desktop image; and
segmenting, using the instruction origin of the desktop image as a segmentation starting point, the desktop image into the image areas that are sequentially arranged along the first direction,
wherein a length k6 in the first direction of each of the image areas except a first image area and a last image area is equal to L,
wherein a length k7 of the first image area in the first direction and a length k8 of the last image area in the first direction meet $y3 \times k6+k7+k8=N$,
wherein $y3=\lceil (N-k7)/k6 \rceil -1$,
wherein N is a total length of the desktop image in the first direction,
wherein $\lceil \ \rceil$ indicates rounding up, and
wherein k7 is equal to a distance in the first direction between an instruction origin of the target image block and the instruction origin of the desktop image.

8. The method of claim 7, wherein a distance L1 in the first direction between the instruction origin of the target image block and the instruction origin of the desktop image meets $0<L1<I$, and wherein a distance L2 in the second direction between the instruction origin of the target image block and the instruction origin of the desktop image meets $0 \leq L2<L'$.

9. The method of claim 4, further comprising dividing the image areas according to a block segmentation solution in a block segmentation solution set to obtain a target image block subset, wherein the target image block subset comprises target image blocks and meets a first target sub-condition or a second target sub-condition, wherein the first target sub-condition is that a third percentage of hit image blocks in the target image block subset is greater than or equal to a target sub-threshold, and wherein the second target sub-condition is that the third percentage is greater than a fourth percentage of hit image blocks in another image block subset.

10. The method of claim 9, further comprising:
determining, from a length value set, a first length value R1 corresponding to the block segmentation solution, wherein the length value set comprises length values, and wherein each length value is less than or equal to a second preset segmentation length L'; and
segmenting the image area into the image blocks that are sequentially arranged along a second direction,
wherein a length p1 in the second direction of each of the image blocks except a first image block and a last image block is equal to L',
wherein a length p2 of the first image block in the second direction and a length p3 of the last image block in the second direction meet $z \times p1+p2+p3=M$,
wherein $z=\lceil (M-p2)/p1 \rceil -1$,
wherein M is a total length of the desktop image in the second direction,
wherein $\lceil \ \rceil$ indicates rounding up,
wherein p2 is equal to the first length value R1, and
wherein the second direction is perpendicular to the first direction.

11. An apparatus comprising:
a memory comprising instructions; and
a processor coupled to the memory and configured to execute the instructions to:
divide a desktop image according to a first image segmentation solution in an image segmentation solution set to obtain a first image block set, wherein the first image block set comprises first image blocks, and wherein each of the first image blocks is a first hit image block or a first missed image block;
divide a copy of the desktop image according to a second image segmentation solution in the image segmentation solution set to obtain a second image block set, wherein the second image block set comprises second image blocks, wherein each of the second image blocks is a second hit image block or a second missed image block, wherein the first image block set meets a first target condition or a second target condition, wherein the first target condition is that a first percentage of the first hit image blocks in the first image block set is greater than or equal to a target threshold, wherein the second target condition is that the first percentage is greater than a second percentage of the second hit image blocks in the second image block set; and send data information and location information of each first image block to a user end, wherein the data information of the first hit image blocks comprises flag values indicating previous sending of the first hit image blocks, wherein the data information of the first missed image blocks comprises image data of the first missed image block, and wherein the location information comprises a location of each first image block.

12. The apparatus of claim 11, wherein the first image segmentation solution comprises a plurality of third image segmentation solutions, and wherein the processor is further configured to divide the desktop image according to the third image segmentation solutions until a percentage of the first hit image blocks is greater than or equal to the target threshold.

13. The apparatus of claim 11, wherein the processor is further configured to:

determine, from between the first percentage and the second percentage, a higher percentage; and select, from between the first image block set and the second image block set, a target image block set corresponding to the higher percentage.

14. The apparatus of claim 11, wherein the first image segmentation solution comprises an area division manner, and wherein the processor is further configured to:

divide the desktop image into image areas along a first direction according to the area division manner; and divide each of the image areas into at least one of the first image blocks.

15. The apparatus according to claim 14, wherein the processor is further configured to:

determine an instruction origin of the desktop image, wherein the instruction origin is a vertex of a bounding rectangle of the desktop image, and wherein the first direction is parallel to a side of the bounding rectangle; and segment, using the instruction origin as a segmentation starting point, the desktop image into the image areas that are sequentially arranged along the first direction, wherein a length k1 in the first direction of each of the image areas except a last image area is equal to a first preset segmentation length, wherein a length k2 of the last image area meets k2=N−y1×k1 and y1=⌈N/k1⌉−1, wherein N is a total length of the desktop image in the first direction, and wherein ⌈ ⌉ indicates rounding up.

16. The apparatus of claim 14, wherein the processor is further configured to segment, using an instruction origin of the desktop image as a segmentation starting point, the desktop image into the image areas that are sequentially arranged along the first direction, wherein the instruction origin is a vertex of a bounding rectangle of the desktop image, and the first direction is parallel to a side of the bounding rectangle, wherein a length k3 in the first direction of each of the image areas except a first image area and a last image area is equal to a first preset segmentation length L, wherein a first boundary of the first image area passes the instruction origin, wherein a coordinate value of a second boundary of the first image area in the first direction in a screen coordinate system falls within a coordinate range of the desktop image in the first direction in the screen coordinate system and is an integer multiple of L, wherein the first boundary and the second boundary are perpendicular to the first direction, wherein a distance between the first boundary and the second boundary is less than or equal to L, wherein a length k4 of the first image area in the first direction and a length k5 of the last image area in the first direction meet: y2×k3+k4+k5=N, wherein y2=⌈(N−k4)/k3⌉−1, wherein N is a total length of the desktop image in the first direction, wherein ⌈ ⌉ indicates rounding up, and wherein k4 is equal to the distance between the first boundary and the second boundary.

17. The apparatus of claim 14, wherein the processor is further configured to:

determine a target image block in a preset area of the desktop image, wherein the target image block is one of the first hit image blocks, wherein a length of the target image block in the first direction is equal to a first preset segmentation length L, wherein a length of the target image block in a second direction is equal to a second preset segmentation length L', wherein the first direction is perpendicular to the second direction, wherein an instruction origin of the preset area is the same as an instruction origin of the desktop image; and segment, using the instruction origin of the desktop image as a segmentation starting point, the desktop image into the image areas that are sequentially arranged along the first direction, wherein a length k6 in the first direction of each of the image areas except a first image area and a last image area is equal to L, wherein a length k7 of the first image area in the first direction and a length k8 of the last image area in the first direction meet y3×k6+k7+k8=N, wherein y3=⌈(N−k7)/k6⌉−1, wherein N is a total length of the desktop image in the first direction, wherein n indicates rounding up, and wherein k7 is equal to a distance, in the first direction, between an instruction origin of the target image block and the instruction origin of the desktop image.

18. The apparatus of claim 17, wherein a distance L1 in the first direction between the instruction origin of the target image block and the instruction origin of the desktop image meets 0<L1<I, and wherein a distance L2 in the second direction between the instruction origin of the target image block and the instruction origin of the desktop image meets 0≤L2<L'.

19. The apparatus of claim 14, wherein the processor is further configured to divide the image areas according to a block segmentation solution in a block segmentation solution set to obtain a target image block subset, wherein the target image block subset comprises target image blocks and meets a first target sub-condition or a second target sub-condition, wherein the first target sub-condition is that a third percentage of hit image blocks in the target image block subset is greater than or equal to a target sub-threshold, and wherein the second target sub-condition is that the third percentage is greater than a fourth percentage of hit image blocks in another image block subset.

20. A non-transitory computer-readable medium comprising instructions that, when executed by a processor, cause an apparatus to:

divide a desktop image according to a first image segmentation solution in an image segmentation solution set to obtain a first image block set, wherein the first image block set comprises first image blocks, and wherein each of the first image blocks is a first hit image block or a first missed image block;

divide a copy of the desktop image according to a second image segmentation solution in the image segmentation solution set to obtain a second image block set, wherein the second image block set comprises second image blocks, wherein each of the second image blocks is a second hit image block or a second missed image block, wherein the first image block set meets a first target condition or a second target condition, wherein the first target condition is that a first percentage of the first hit image blocks in the first image block set is greater than or equal to a target threshold, wherein the second target condition is that the first percentage is greater than a second percentage of the second hit image blocks in the second image block set; and send data information and location information of each first image block to a user end, wherein the data information of the first hit image blocks comprises flag values indicating previous sending of the first hit image blocks, wherein the data information of the first missed image blocks comprises image data of the first missed image blocks, and wherein the location information comprises a location of each first image block.

\* \* \* \* \*

UNITED STATES PATENT AND TRADEMARK OFFICE
CERTIFICATE OF CORRECTION

PATENT NO. : 11,080,859 B2  
APPLICATION NO. : 16/751957  
DATED : August 3, 2021  
INVENTOR(S) : Yong Li Page 1 of 1

It is certified that error appears in the above-identified patent and that said Letters Patent is hereby corrected as shown below:

In the Claims

Claim 17, Column 40, Line 36: "wherein n indicates rounding up" should read "wherein ⌈ ⌉ indicates rounding up"

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*